United States Patent
Hisamitsu et al.

(10) Patent No.: US 6,787,201 B2
(45) Date of Patent: Sep. 7, 2004

(54) LIQUID CRYSTAL COMPOSITION AND LIQUID CRYSTAL LIGHT MODULATING APPARATUS

(75) Inventors: Akihito Hisamitsu, Amagasaki (JP); Takeshi Kitahora, Osaka (JP); Fumie Motoori, Ibaraki (JP); Hideaki Ueda, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 56 days.

(21) Appl. No.: 10/238,119

(22) Filed: Sep. 10, 2002

(65) Prior Publication Data

US 2003/0066985 A1 Apr. 10, 2003

(30) Foreign Application Priority Data

Sep. 26, 2001 (JP) ........................................ 2001-292978

(51) Int. Cl.[7] ........................ C09K 19/34; C09K 19/30; C09K 19/20; G02F 1/133
(52) U.S. Cl. .............. 428/1.3; 252/299.61; 252/299.63; 252/299.67; 349/185
(58) Field of Search ........................... 349/185; 428/1.1, 428/1.3; 252/299.61, 299.63, 299.67, 299.5, 299.01

(56) References Cited

U.S. PATENT DOCUMENTS

| | | | | |
|---|---|---|---|---|
| 5,044,735 A | * | 9/1991 | Asano et al. ................ | 349/136 |
| 5,972,240 A | | 10/1999 | Kobayashi et al. ..... | 252/299.01 |
| 6,274,208 B1 | * | 8/2001 | Iwamatsu et al. ............ | 428/1.1 |
| 6,338,883 B1 | * | 1/2002 | Iwamatsu et al. ............ | 428/1.1 |
| 6,348,961 B2 | * | 2/2002 | Iwamatsu et al. ........... | 349/175 |
| 6,416,826 B1 | | 7/2002 | Matsumoto et al. ......... | 428/1.1 |
| 6,599,589 B1 | * | 7/2003 | Iwamatsu et al. ............ | 428/1.1 |

FOREIGN PATENT DOCUMENTS

JP 2000-063838 A 2/2000

* cited by examiner

*Primary Examiner*—Shean C. Wu
(74) *Attorney, Agent, or Firm*—Sidley Austin Brown & Wood LLP

(57) ABSTRACT

A chiral nematic liquid crystal composition that exhibits a cholesteric phase, said chiral nematic crystal composition comprising 55 wt % to 90 wt % of a nematic liquid crystal composition that comprises, as main components thereof, a liquid crystal ester compound and a liquid crystal pyrimidine compound, wherein said liquid crystal ester compound does not include a tolan skeleton therein and said liquid crystal pyrimidine compound includes a fluorine atom therein; and 10 wt % to 45 wt % of at least one chiral agent. A liquid crystal light modulating apparatus comprising a pair of substrates at least one of which is transparent; and the chiral nematic liquid crystal composition disposed between the substrates.

23 Claims, 5 Drawing Sheets

LIQUID CRYSTAL COMPOSITION AND LIQUID CRYSTAL LIGHT MODULATING APPARATUS

CROSS-REFERENCE TO RELATED APPLICATION

This application is based on Japanese patent application No.2001-292978 filed in Japan on Sep. 26, 2001, the entire content of which is hereby incorporated by reference.

BACKGROUND OF THE INVENTION

1. Field of the Invention

The present invention relates to a liquid crystal composition and a liquid crystal light modulating apparatus using the liquid crystal composition.

2. Description of Related Art

The liquid crystal light modulating apparatus basically comprises a pair of substrates and a liquid crystal layer disposed between the substrates. When a drive voltage is applied to the liquid crystal layer, the arrangement of liquid crystal molecules is controlled so that light incident on the liquid crystal light modulating apparatus is modulated to perform a desired image display.

A wide variety of liquid crystal display methods have been proposed.

In recent years, research has been conducted on liquid crystal light modulating apparatuses using a chiral nematic liquid crystal composition containing a chiral material so that the composition is caused to exhibit a cholesteric liquid crystal phase at room temperature due to the chiral material.

It is known that this type of liquid crystal light modulating apparatus is useful, for example, as an apparatus which can be driven with a low consumption of electric power utilizing a selective reflection capability of the chiral nematic liquid crystal composition.

In the reflection type liquid crystal light modulating apparatus, image display can be performed by applying a high or low pulse voltage to switch the liquid crystal composition to a planar state (colored state) or to a focal conic state (transparent state).

Even after stopping the application of such pulse voltage, the liquid crystal composition can be held in the planar state, the focal conic state or a mixed state, in other words, can exhibit the so-called bi-stable property and can achieve a memory effect, whereby the image display can be kept after stopping the application of voltage.

Such liquid crystal light modulating apparatus using the chiral nematic liquid crystal composition is required to achieve a high performance in image display such as enhanced color purity and high reflectance, to show a sharp contrast and involve a low drive voltage.

SUMMARY OF THE INVENTION

An object of the invention is to provide a chiral nematic liquid crystal composition which is useful for providing a liquid crystal light modulating apparatus which can achieve a high performance in image display such as enhanced color purity and high reflectance, can show a sharp contrast and involves a low drive voltage.

Another object of the invention is to provide a liquid crystal light modulating apparatus which can achieve a high performance in the image display such as enhanced color purity and high reflectance, can show a sharp contrast and involves a low drive voltage.

The inventors conducted extensive research to achieve the foregoing objects and found the following.

In a liquid crystal light modulating apparatus comprising a pair of substrates at least one of which is transparent and a chiral nematic liquid crystal composition disposed between the substrates and comprising a nematic liquid crystal composition and a chiral agent, a high performance such as enhanced color purity and high reflectance can be achieved in image display, a sharp contrast is shown and a low drive voltage is involved, when the chiral nematic liquid crystal composition comprises 55 wt % to 90 wt % of a nematic liquid crystal composition that comprises, as main components thereof, a liquid crystal ester compound and a fluorine-containing liquid crystal pyrimidine compound, and 10 wt % to 45 wt % of at least one kind of chiral agent, the chiral nematic liquid crystal composition being able to exhibit a cholesteric phase (at about 25° C.).

The present invention was completed based on the above-described findings and provides a chiral nematic liquid crystal composition and a liquid crystal light modulating apparatus as described below.

(1) Chiral Nematic Liquid Crystal Composition

The present invention provides a chiral nematic liquid crystal composition that exhibits a cholesteric phase, and that comprises 55 wt % to 90 wt % of a nematic liquid crystal composition that comprises, as main components thereof, a liquid crystal ester compound and a liquid crystal pyrimidine compound, wherein the liquid crystal ester compound does not include a tolan skeleton therein and the liquid crystal pyrimidine compound includes a fluorine atom therein; and 10 wt % to 45 wt % of at least one chiral agent.

The amount (wt %) of the nematic liquid crystal composition and the amount (wt %) of the chiral agent are values per 100 wt % of the total weight of the nematic liquid crystal composition and the chiral agent.

(2) Liquid Crystal Light Modulating Apparatus

The present invention also provides a liquid crystal light modulating apparatus comprising a pair of substrates at least one of which is transparent, and the aforementioned chiral nematic liquid crystal composition disposed between the substrates.

The foregoing and other objects, features, aspects and advantages of the present invention will become more apparent from the following detailed description and the accompanying drawings.

BRIEF DESCRIPTION OF THE DRAWINGS

FIG. 1(A) shows a planar state (R (red), G (green) and B (blue) colored state) of the chiral nematic liquid crystal composition when a high pulse voltage is applied thereto. FIG. 1(B) shows a focal conic state (transparent/black display state) of the chiral nematic liquid crystal composition when a low pulse voltage is applied thereto.

FIG. 2(A) shows a planar state of the chiral nematic liquid crystal composition when a high pulse voltage is applied thereto. FIG. 2(B) shows a focal conic state of the chiral nematic liquid crystal composition when a low pulse voltage is applied thereto.

FIG. 4 (A) shows a planar state of the chiral nematic liquid crystal composition when a high pulse voltage is applied thereto. FIG. 4(B) shows a focal conic state of the chiral nematic liquid crystal composition when a low pulse voltage is applied thereto.

FIG. 5(A) shows a planar state of the chiral nematic liquid crystal composition when a high pulse voltage is applied thereto. FIG. 5(B) shows a focal conic state of the chiral nematic liquid crystal composition when a low pulse voltage is applied thereto.

Figure 1A:
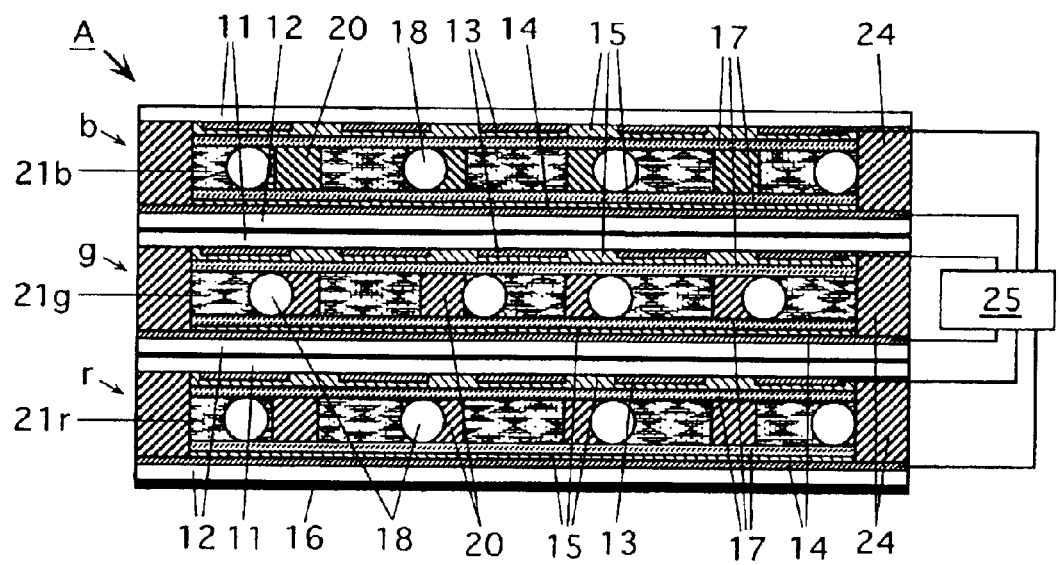
FIG. 1(A) and FIG. 1(B) are schematic views showing a sectional structure of an example of the liquid crystal light modulating apparatus.

DESCRIPTION OF THE PREFERRED EMBODIMENTS (1) Chiral Nematic Liquid Crystal Composition A preferred chiral nematic liquid crystal composition of the invention is one which exhibits a cholesteric phase and which comprises: 55 wt % to 90 wt % of a nematic liquid crystal composition that comprises, as main components thereof, a liquid crystal ester compound and a liquid crystal pyrimidine compound, wherein the liquid crystal ester compound does not include a tolan skeleton therein and the liquid crystal pyrimidine compound includes a fluorine atom therein; and 10 wt % to 45 wt % of at least one chiral agent.

The amount (wt %) of the nematic liquid crystal composition and the amount (wt %) of the chiral agent are values per 100 wt % of the total weight of the nematic liquid crystal composition and the chiral agent.

(2) Liquid Crystal Light Modulating Apparatus

A preferred liquid crystal light modulating apparatus of the invention is one basically comprising a pair of substrates at least one of which is transparent; and the aforementioned chiral nematic liquid crystal composition disposed between the substrates.

According to such chiral nematic liquid crystal composition and such liquid crystal light modulating apparatus having the composition disposed between a pair of substrates, an excellent performance in image display such as enhanced color purity and high reflectance can be achieved, a sharp contrast in image display can be achieved and the image display can be performed with a low drive voltage.

This advantage is given because of use of the chiral nematic liquid crystal composition that exhibits a cholesteric phase and that comprises 55 wt % to 90 wt % of a nematic liquid crystal composition that comprises, as main components thereof, a liquid crystal ester compound and a liquid crystal pyrimidine compound; and 10 wt % to 45 wt % of at least one chiral agent.

In the nematic liquid crystal composition, a total amount of the liquid crystal ester compound and the fluorine-containing liquid crystal pyrimidine compound is preferably such that these compounds are predominantly contained in the nematic liquid crystal composition compared with the other compound(s) in the nematic liquid crystal composition, namely they are present as main components. For example, a total amount of the two compounds is at least 45 wt % of a total amount of the nematic liquid crystal composition, more preferably 50 wt % to 100 wt % of a total amount of the composition. In this case, the liquid crystal light modulating apparatus is remarkable in the above-mentioned performance such as color purity and reflectance.

The nematic liquid crystal composition may further comprise at least one of a liquid crystal biphenyl compound, a liquid crystal phenylcyclohexane compound, a liquid crystal tolan compound and a liquid crystal terphenyl compound.

For example, advantageously the viscosity of the nematic liquid crystal composition can be reduced and the speed of response can be increased by incorporating a liquid crystal tolan compound and/or a liquid crystal phenylcyclohexane compound into the composition. The incorporation of a liquid crystal biphenyl compound and/or a liquid crystal terphenyl compound can elevate the phase transition temperature, thereby can contribute to extension of temperature compensation range and can improve the reliability of the liquid crystal light modulating apparatus.

When the nematic liquid crystal composition contains at least one of a liquid crystal biphenyl compound, a liquid crystal phenylcyclohexane compound, a liquid crystal tolan compound and a liquid crystal terphenyl compound, each of these compounds is used in an amount of preferably 10 wt % to 55 wt %, more preferably 50 wt % or less of a total amount of the nematic liquid crystal composition. When the amount is less than 10 wt %, the color purity and the reflectance as the performance of the liquid crystal light modulating apparatus can not be significantly improved. The amount of more than 55 wt % reduces the amounts of the liquid crystal ester compound and the liquid crystal pyrimidine compound having a fluorine atom in the molecule, thereby posing the problems that the color purity and the reflectance are impaired and the drive voltage is increased.

Preferably the amount of each of the liquid crystal ester compound and the fluorine-containing liquid crystal pyrimidine compound in the nematic liquid crystal composition is in the range of, e.g., 15 wt % to 85 wt % of a total amount of the nematic liquid crystal composition.

In any case, the liquid crystal ester compound in the nematic liquid crystal composition may be one which has a significant dielectric constant anisotropy, for example, one which includes at least one of a fluorine group, a chlorine group and a cyano group. Especially when using a liquid crystal ester compound having a structure that it contains a cyano group in the terminal, a fluorine group in the molecule and/or chlorine group in the molecule and thereby it has great polarity, the drive voltage can be lowered.

The chiral nematic liquid crystal composition has an advantage that the selective reflection wavelength can be controlled by varying the amount of the chiral agent (chiral dorpant) in the composition.

The chiral nematic liquid crystal composition contains 10 wt % to 45 wt % of a chiral agent. When the amount of the chiral agent is less than 10 wt %, a sufficient reflecting property and memory effect are unlikely to be achieved, whereas more than 45 wt % does not allow the chiral nematic liquid crystal composition to exhibit a cholesteric phase at room temperature or may solidify the composition.

The chiral nematic liquid crystal composition contains at least one kind of chiral agent, or two or more kinds of chiral agents, e.g. 2 to 4 kinds of chiral agents. When using a mixture of two or more kinds of chiral agents in the composition, it is possible to adjust a shift amount of selective reflection wavelength due to the temperature, and the composition is allowed to show stable temperature properties.

The chiral nematic liquid crystal composition may contain a dye. In this case, the color purity can be improved, e.g., by inhibiting the undesired scattering of light.

At least one of the paired substrates in the liquid crystal light modulating apparatus may be made of a resin. By use of resin substrates, a lightweight and thin liquid crystal light modulating apparatus can be provided. Further the liquid crystal light modulating apparatus including resin substrates is rarely broken. In any case, the drive voltage of the apparatus may be, e.g., 40V or less.

The liquid crystal light modulating apparatus may have no resin network structure between the pair of substrates.

The liquid crystal light modulating apparatus may have a plurality of structures formed chiefly from a polymer (resin structures), typically resin nodules, provided between the pair of substrates. Examples of the resin nodule include those which form column structures connecting the pair of substrates to each other, and those which form rib structures, each extending from one of the substrates and being terminated at an intermediate of a gap between the substrates.

As explained above, a plurality of structures formed chiefly from a polymer can be provided between the pair of substrates, whereby liquid crystal panels of large area can be produced, and the precision of thickness between the substrates and the strength can be increased and the memory effect of the apparatus is improved.

It is possible to provide a laminate type (layered type) liquid crystal light modulating apparatus comprising a plurality of liquid crystal light modulating units layered on each other among which at least one of the units is substantially identical with the liquid crystal light modulating apparatus of the invention. In this case, a full color display can be performed, for example, by laminating (layering) at least three liquid crystal light modulating units, i.e., a liquid crystal light modulating unit having a liquid crystal composition capable of selectively reflecting a red light wavelength, a liquid crystal light modulating unit having a liquid crystal composition capable of selectively reflecting a green light wavelength, and a liquid crystal light modulating unit having a liquid crystal composition capable of selectively reflecting a blue light wavelength.

The following description will be given with reference to the drawings on embodiments of the liquid crystal light modulating apparatus of the invention and the chiral nematic liquid crystal composition to be used in the apparatus.

<Liquid Crystal Light Modulating Apparatus of First Embodiment>

(Overall Structure)

Figure 1B:
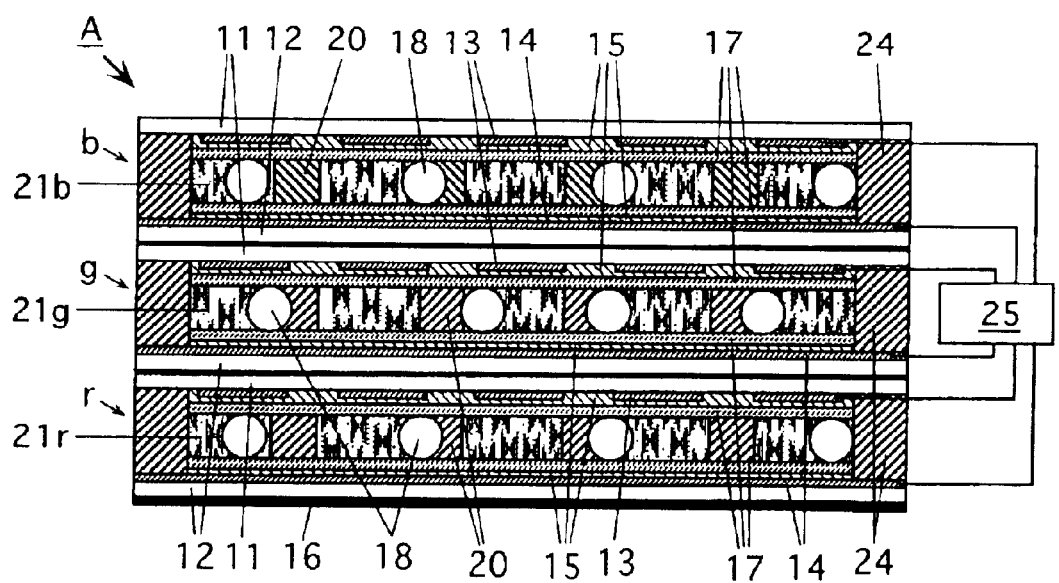

FIG. 1(A) and FIG. 1(B) are schematic views showing a sectional structure of a reflection/laminate type liquid crystal light modulating apparatus of the first embodiment. FIG. 1(A) shows a planar state (R (red), G (green) and B (blue) colored state) of the chiral nematic liquid crystal composition when a high pulse voltage is applied thereto. FIG. 1(B) shows a focal conic state (transparent/black display state) of the chiral nematic liquid crystal composition when a low pulse voltage is applied thereto. The liquid crystal light modulating apparatus can achieve a memory effect. The planar state and the focal conic state can be kept after application of pulse voltage.

A laminate type liquid crystal light modulating apparatus A has three laminated (layered) liquid crystal layers (liquid crystal display elements) containing liquid crystal compositions 21r, 21g, 21b, respectively, i.e. an R liquid crystal layer r (red layer (red liquid crystal display element)) capable of performing red display, a G liquid crystal layer g (green layer (green liquid crystal display element)) capable of performing green display, and a B liquid crystal layer b (blue layer (blue liquid crystal display element)) capable of performing blue display, the layers being superimposed on each other in this order.

R, G, B liquid crystal layers r, g, b comprise liquid crystal compositions 21r, 21g, 21b, respectively disposed between a pair of substrates 11, 12 at least one of which (both of which in this embodiment) is transparent.

In the liquid crystal layers r, g, b, 11, 12 indicate transparent substrates having light transparency. On the surfaces of transparent substrates 11, 12 are formed a plurality of strips of transparent electrodes 13, 14 extending with a gap in parallel with each other. The transparent electrodes 13, 14 are opposed to each other so as to extend across each other when viewed in a direction orthogonal to the substrates. An insulating film is preferably formed on the electrodes. In this embodiment, an insulating film 15 is formed on each of the electrodes 13, 14. An orientation stabilizing film 17 is formed on the insulating film 15. When required, a visible light absorbing layer is provided on an external surface (rear surface) of the substrate on the side opposite to a light incident side. In this embodiment, a visible light absorbing layer 16 is formed on a rear side of the substrate 12 in the red layer r.

18, 20 indicate a spacer and a column structure, respectively, each serving as a space-retaining member. 21r, 21g, 21b designate the chiral nematic liquid crystal compositions which exhibit a cholesteric phase at room temperature (about 25° C.). These materials and their combinations will be described later, and will be specifically stated in Experiment Examples given later. A sealing material is designated 24 and is used for sealing the liquid crystal compositions 21r, 21g, 21b, respectively between the substrates 11, 12.

A pulse-applying device is designated 25 and is used for applying a predetermined pulse voltage across the electrodes 13, 14 in the liquid crystal layers.

(Substrate)

The substrates 11, 12 have light transparency as stated above. The substrate on the image observation side should be at least so light-transparent as to pass visible light therethrough for observation of images. Examples of the light-transparent substrates include glass substrates. Also usable are flexible substrates made of polycarbonate, polyether sulfone, polyethylene terephthalate or the like as well as glass substrates.

(Electrode)

Examples of the electrode are transparent electrically conductive films, typically ITO (indium tin oxide) films, metal electrodes made of aluminum, silicon or like metals, and photoconductive films made of amorphous silicon, BSO (bismuth silicon oxide) or the like.

In the liquid crystal light modulating apparatus A shown in FIG. 1, as described above,
a plurality of strips of transparent electrodes 13, 14 formed on the surfaces of transparent substrates 11, 12 extend with a gap in parallel with each other. The substrates 11, 12 are opposed to each other so that the transparent electrodes 13, 14 are directed in a direction orthogonal to each other. Each display pixel corresponds to a region in which the transparent electrodes 13, 14 are superimposed on each other. A region wherein light modulation is induced by the liquid crystal composition, namely a region wherein an image display is performed, is called a display region. A surrounding area is the outside of the display region wherein light modulation is not induced.

For forming an electrode in this way, for example, an ITO film is deposited on the substrate with an electrode pattern mask by sputtering or the like, or the film is patterned by photolithography after forming the ITO film over the entire area. Further, a plurality of TFT's may be used as a switching element corresponding to each pixel.

(Insulating Film and Orientation Stabilizing Film)

Examples of the insulating film include inorganic films made of inorganic materials such as silicon oxide and organic films made of organic materials such as polyimide resin, epoxy resin or the like. The insulating film can prevent short circuit between the electrodes and can improve the reliability of liquid crystal display elements when used as a gas barrier layer. As stated above, in the apparatus A shown in FIG. 1(A), the insulating film 15 is formed on each of the electrodes 13, 14.

When necessary, an orientation stabilizing film typically made of polyimide resin may be formed on the electrodes. As stated above, an orientation stabilizing film 17 is formed in this embodiment on each of the insulating films 15 over the electrodes 13, 14.

The insulating film and the orientation stabilizing film can be formed of the same material as a polymer resin used for making column structures.

(Spacer)

Spacers may be provided between a pair of substrates for retaining the gap uniformly between the pair of substrates. Examples of the spacers are spherical bodies made of resins or inorganic oxides. In this embodiment, the liquid crystal element A is provided with spherical spacers 18 between the substrates 11, 12.

When spherical spacers and column structures are provided as in this embodiment, the distance between the substrates can be precisely and properly maintained. The distance between the substrates can be precisely kept even when using a flexible substrate such as substrates made of a resin, or when utilizing a display region of large area. Therefore, spacers are preferred. Column structures may be used alone as a space-retaining member.

(Liquid Crystal Composition)

The chiral nematic liquid crystal composition in each liquid crystal layer comprises 55 wt % to 90 wt % of a nematic liquid crystal composition that comprises, as main components thereof, a liquid crystal ester compound and a liquid crystal pyrimidine compound containing a fluorine atom in the molecule, and 10 wt % to 45 wt % of a chiral agent. The chiral nematic liquid crystal composition, as described above, exhibits a cholesteric phase at room temperature (about 25° C.). The chiral nematic liquid crystal composition may contain a dye.

The nematic liquid crystal composition may further comprise at least one of a liquid crystal biphenyl compound, a liquid crystal phenylcyclohexane compound, a liquid crystal tolan compound and a liquid crystal terphenyl compound.

The liquid crystal composition is prepared so as to obtain a desired selective reflection wavelength. The selective reflection wavelength can be adjusted, for example, by varying the amount of the chiral agent. Generally the selective reflection wavelength is shifted to a short wavelength side by increasing the amount of the chiral agent. The selective reflection wavelength is a peak wavelength in a visible light region of reflected light spectrum when the liquid crystal composition is brought to a planar state by applying a pulse voltage across the electrodes 13, 14 in each liquid crystal layer.

The liquid crystal pyrimidine compound containing a fluorine atom which can be used in the nematic liquid crystal composition is represented by the following general formula (A), wherein each of "A" and "A'" is a single bond or a phenylene group, provided that they can not be a phenylene group at the same time, each of "$X_1$" and "$X_2$" is a fluorine atom or a hydrogen atom, provided that they can not be a hydrogen atom at the same time, and "n" is an integer of 2 to 10.

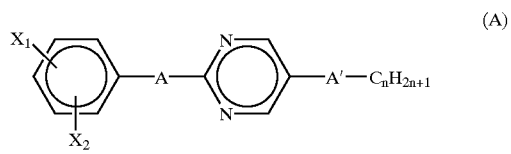

(A)

Specific examples of the liquid crystal pyrimidine compound are those represented by the formulae (A1) to (A28).

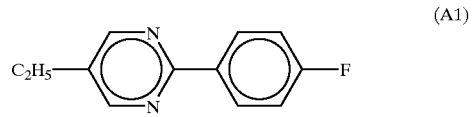

(A1)

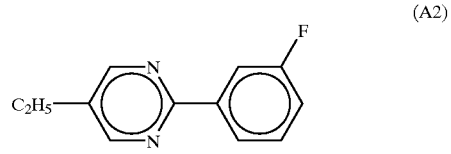

(A2)

(A3)

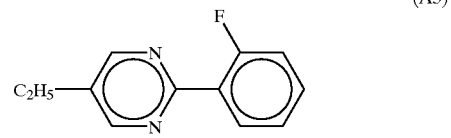

(A4)

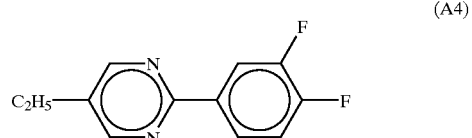

(A5)

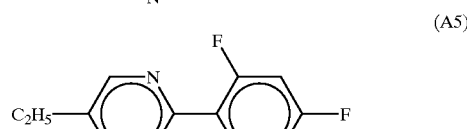

(A6)

(A7)

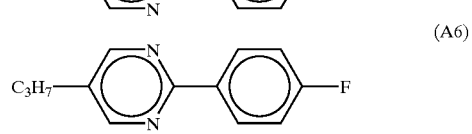

(A8)

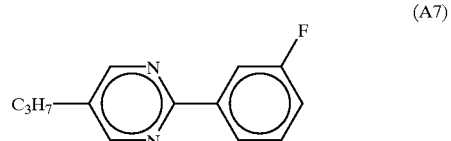

(A9)

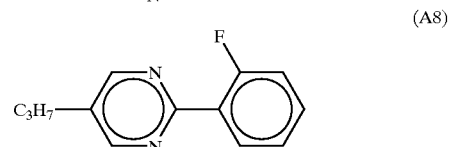

(A10)

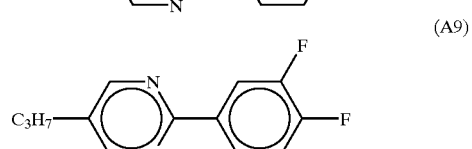

(A11) 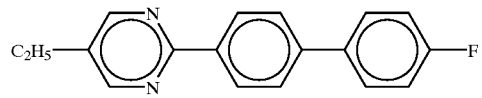

(A12) 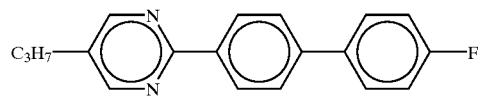

(A13) 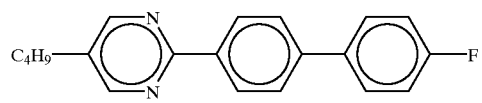

(A14) 

(A15) 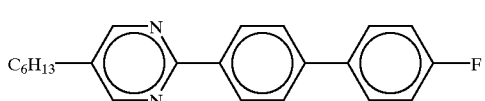

(A16) 

(A17) 

(A18) 

(A19) 

(A20) 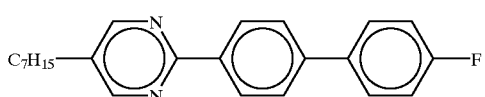

(A21) 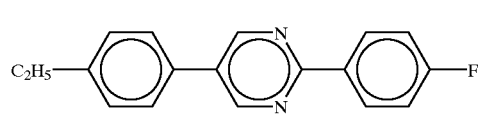

(A22) 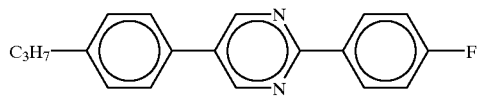

(A23) 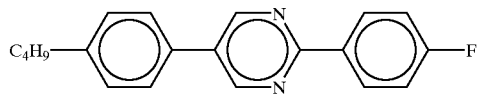

(A24) 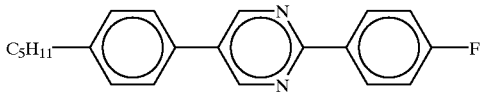

(A25) 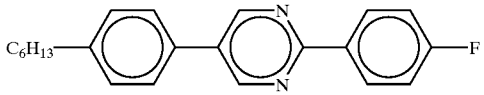

(A26) 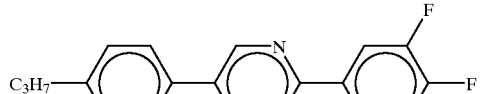

(A27) 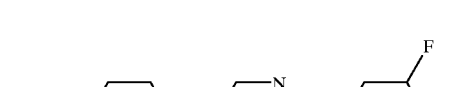

(A28) 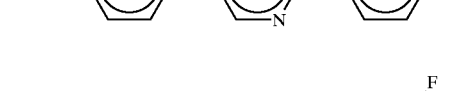

The liquid crystal ester compound which can be used in the nematic liquid crystal composition is represented by the following general formula (B) or (B'), wherein each of "$R_1$" and "$R_2$" is a cyano group or an alkyl group represented by —$C_nH_{2n+1}$ wherein "n" is an integer of 2 to 10, "X" is a halogen atom or a hydrogen atom, each of "a" and "b" is an integer of 0, 1 or 2, provided that "a" and "b" can not be 0 at the same time.

(B) 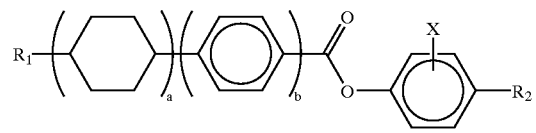

(B') 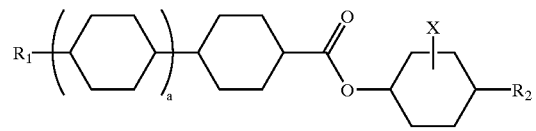

Specific examples of the liquid crystal ester compound are those represented by the formulae (B1) to (B90) and (B'1) to (B'40).
(B1) 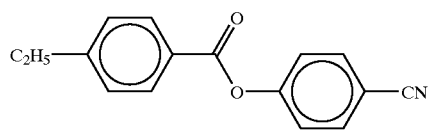
(B2) 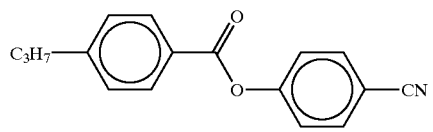
(B3) 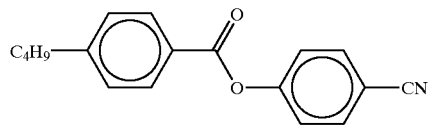
(B4) 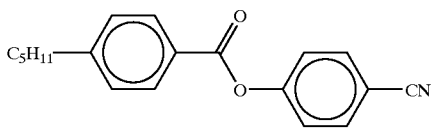
(B5) 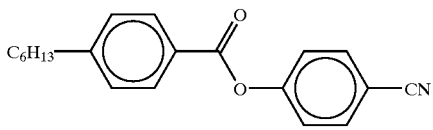
(B6) 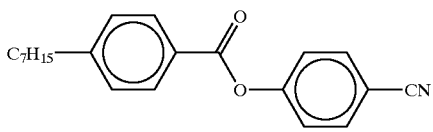
(B7) 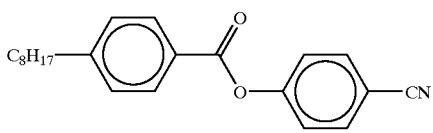
(B8) 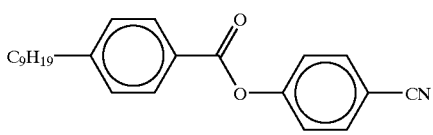
(B9) 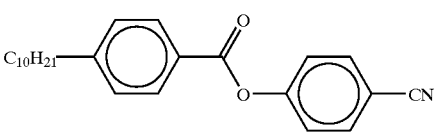
(B10) 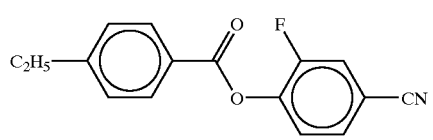
(B11) 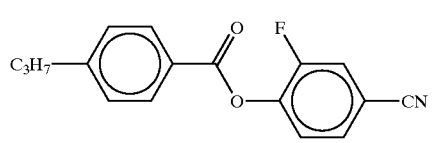
-continued
(B12) 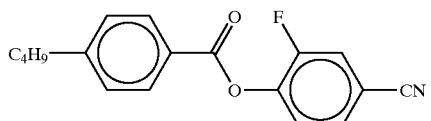
(B13) 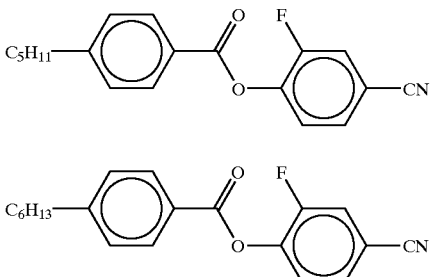
(B14) 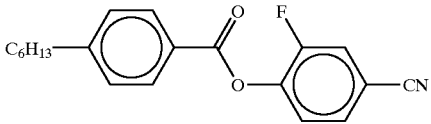
(B15) 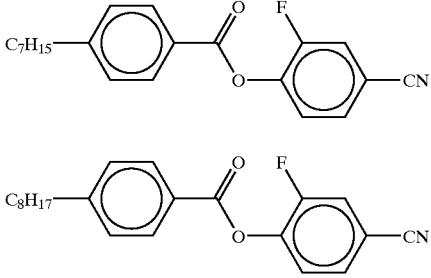
(B16) 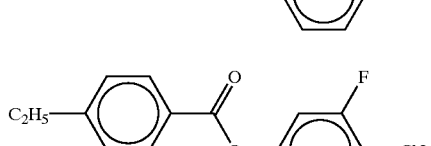
(B17) 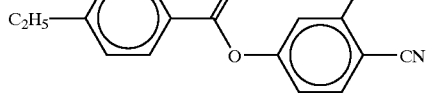
(B18) 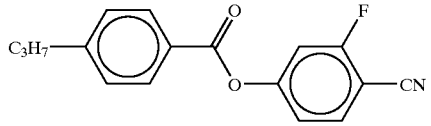
(B19) 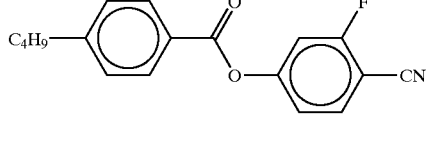
(B20) 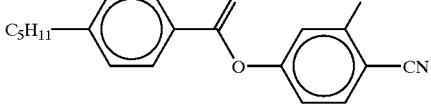
(B21) 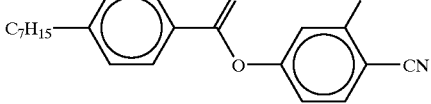
(B22) 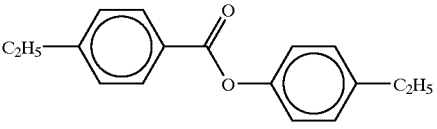

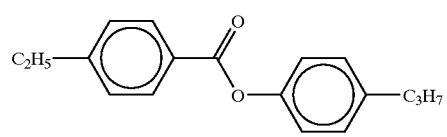 (B23)
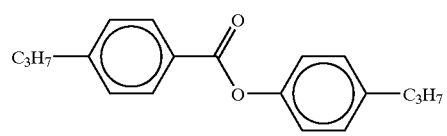 (B24)
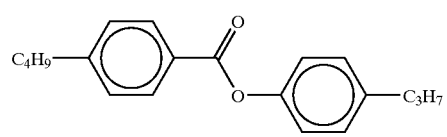 (B25)
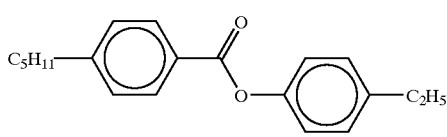 (B26)
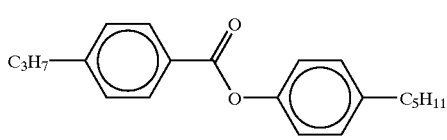 (B27)
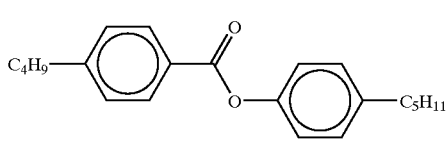 (B28)
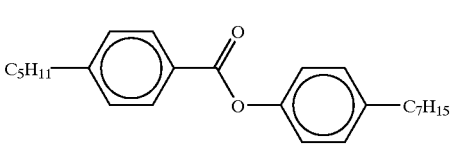 (B29)
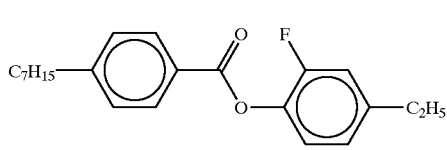 (B30)
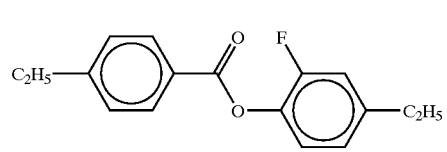 (B31)
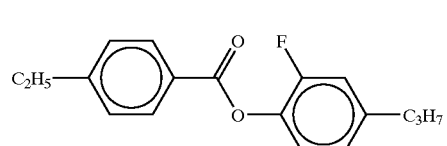 (B32)
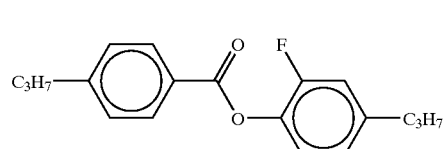 (B33)
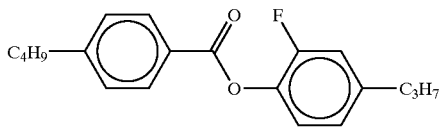 (B34)
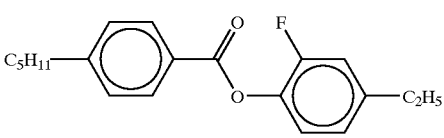 (B35)
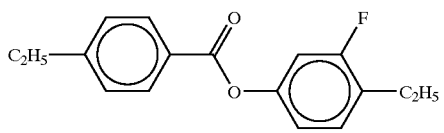 (B36)
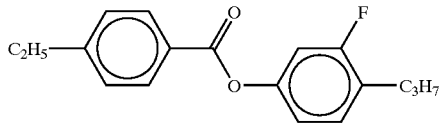 (B37)
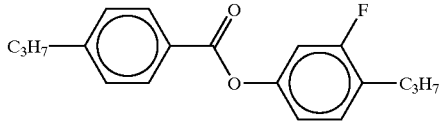 (B38)
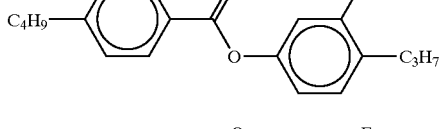 (B39)
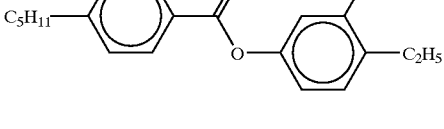 (B40)
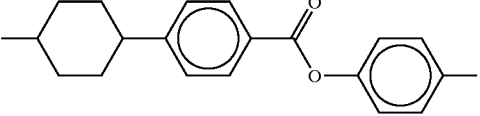 (B41)
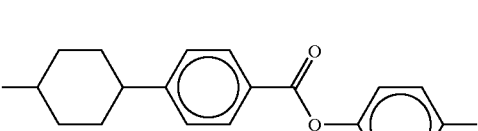 (B42)
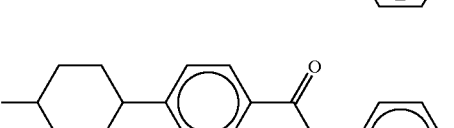 (B43)
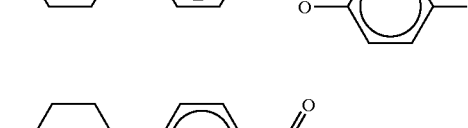 (B44)

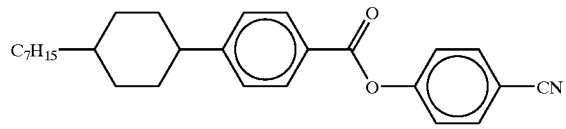 (B45)
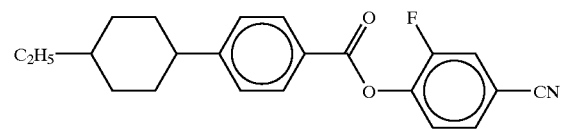 (B46)
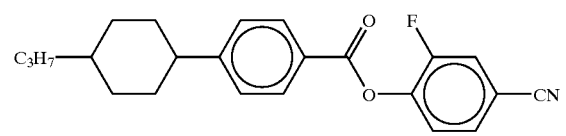 (B47)
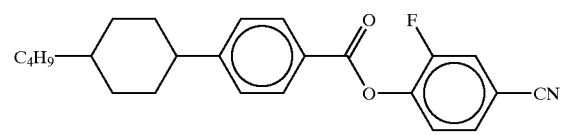 (B48)
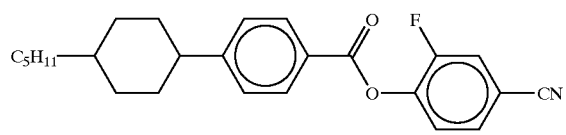 (B49)
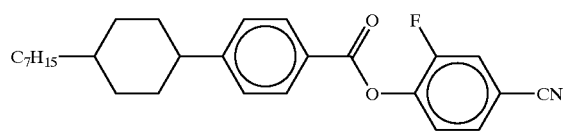 (B50)
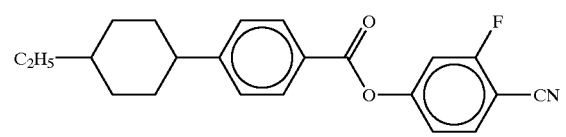 (B51)
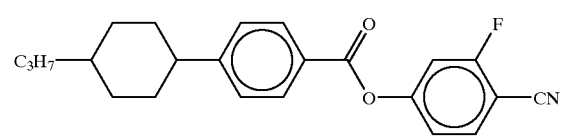 (B52)
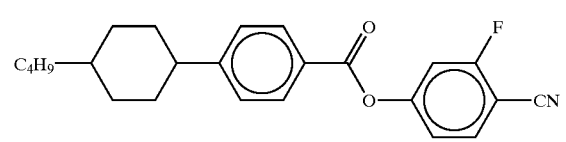 (B53)
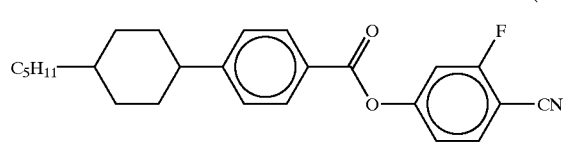 (B54)
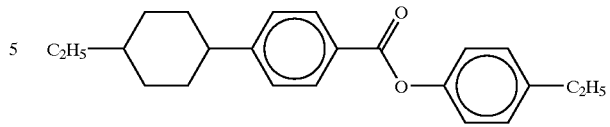 (B55)
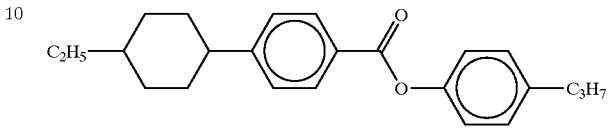 (B56)
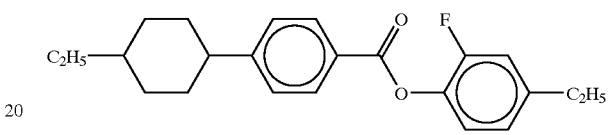 (B57)
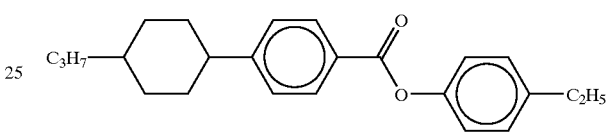 (B58)
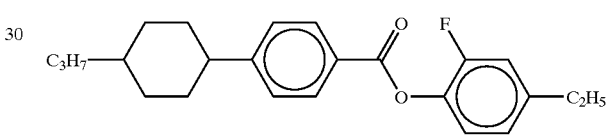 (B59)
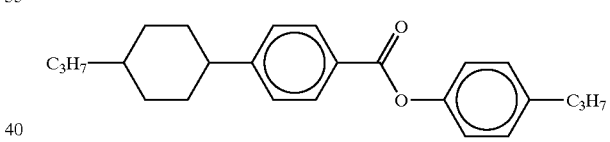 (B60)
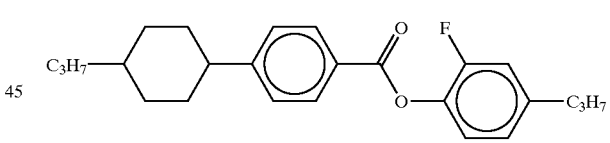 (B61)
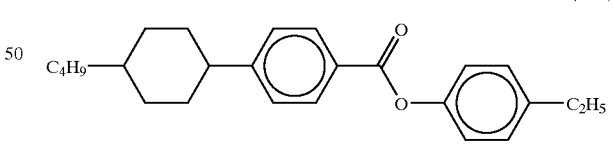 (B62)
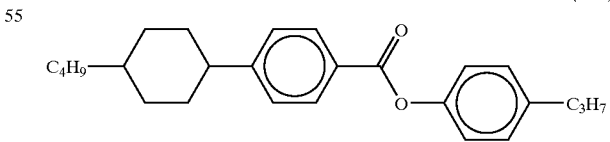 (B63)
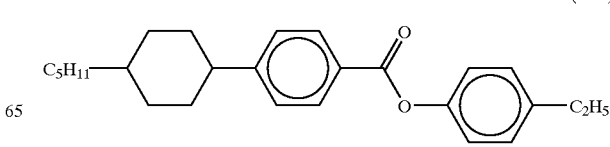 (B64)

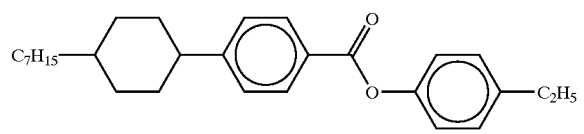
(B65)
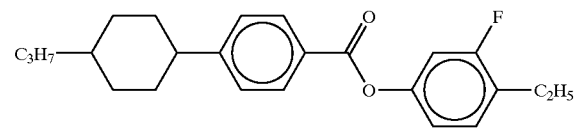
(B66)
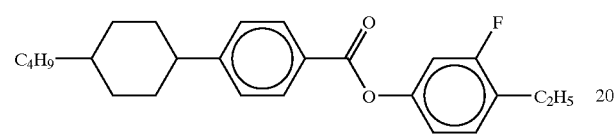
(B67)
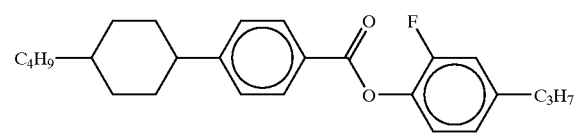
(B68)
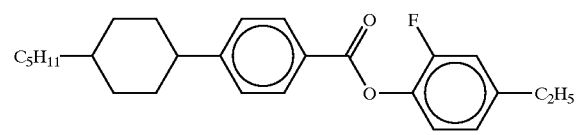
(B69)
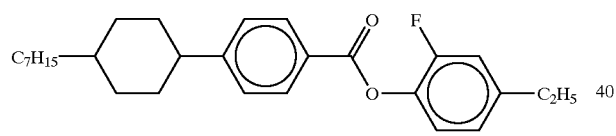
(B70)
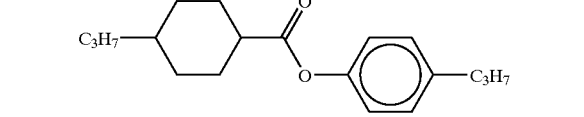
(B71)
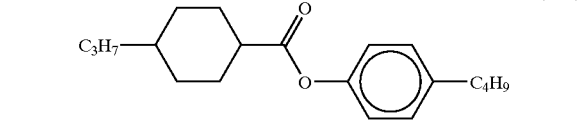
(B72)
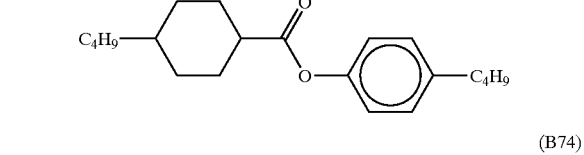
(B73)
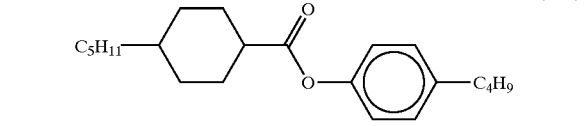
(B74)
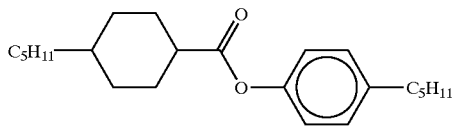
(B75)
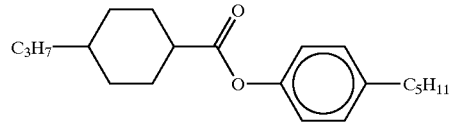
(B76)
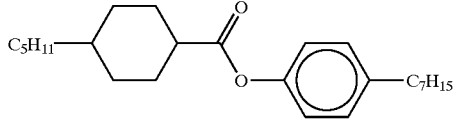
(B77)
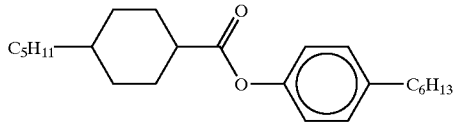
(B78)
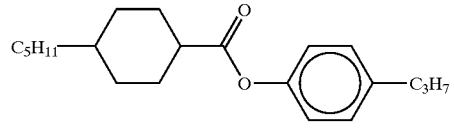
(B79)
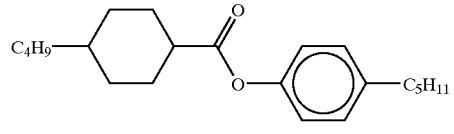
(B80)
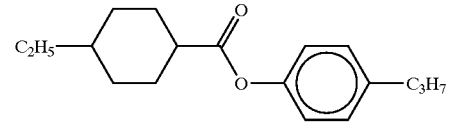
(B81)
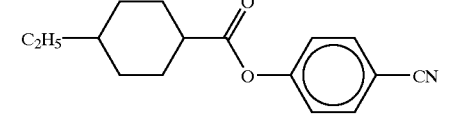
(B82)
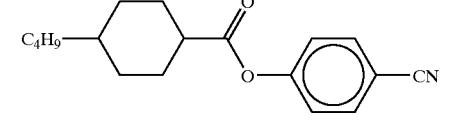
(B83)
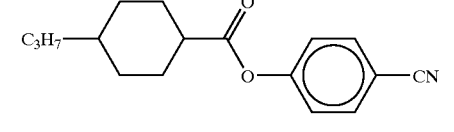
(B84)
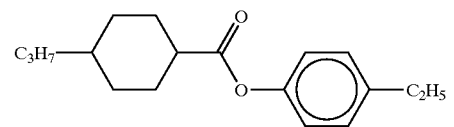
(B85)

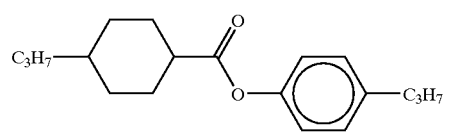
(B86)
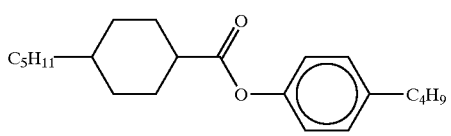
(B87)
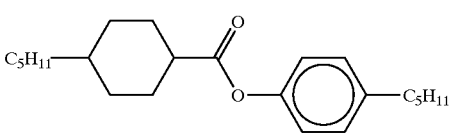
(B88)
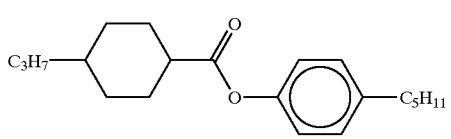
(B89)
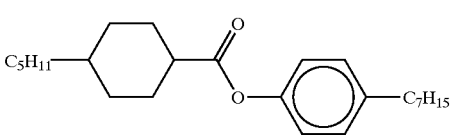
(B90)
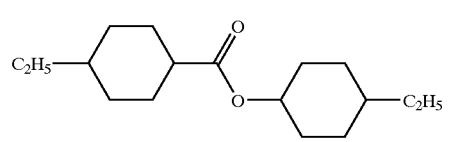
(B'1)
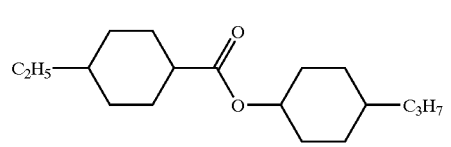
(B'2)
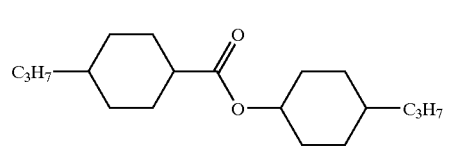
(B'3)
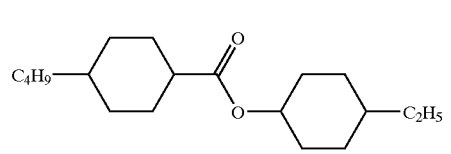
(B'4)
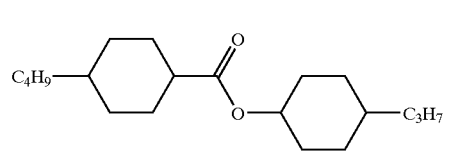
(B'5)
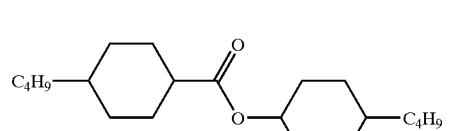
(B'6)
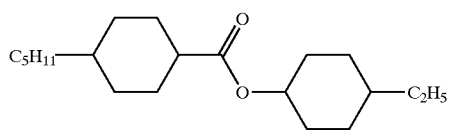
(B'7)
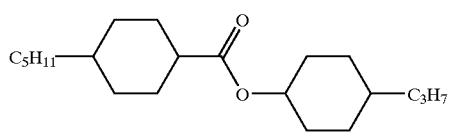
(B'8)
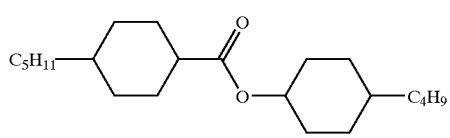
(B'9)
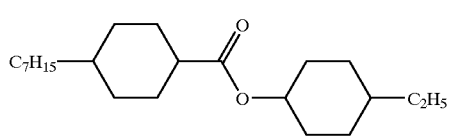
(B'10)
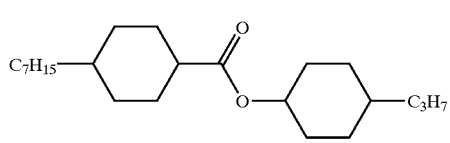
(B'11)
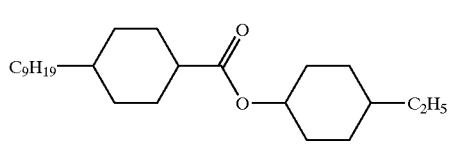
(B'12)
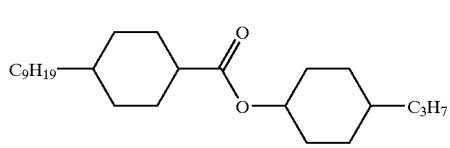
(B'13)
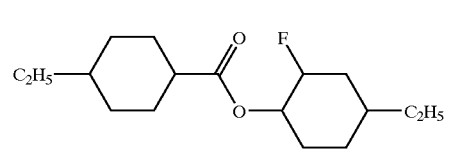
(B'14)
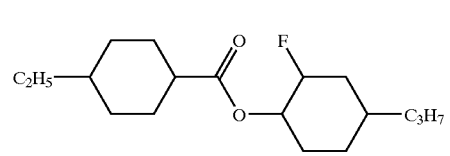
(B'15)
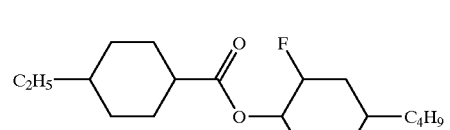
(B'16)
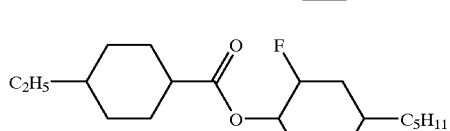
(B'17)

(B'18) 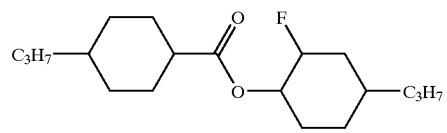
(B'19) 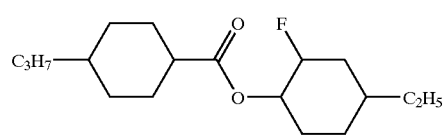
(B'20) 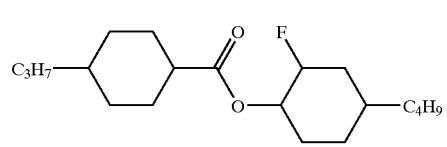
(B'21) 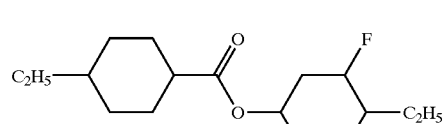
(B'22) 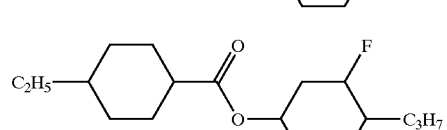
(B'23) 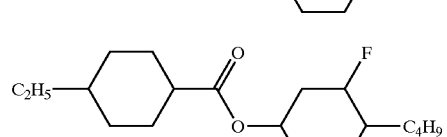
(B'24) 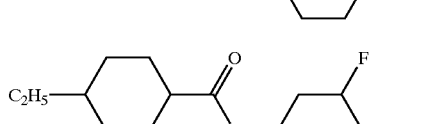
(B'25) 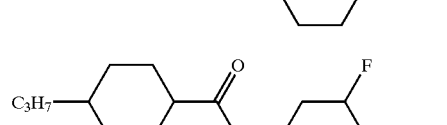
(B'26) 
(B'27) 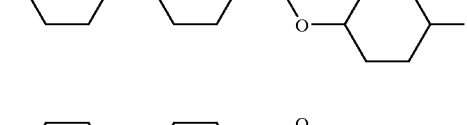
(B'28) 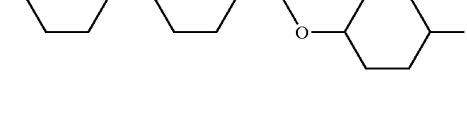
(B'29) 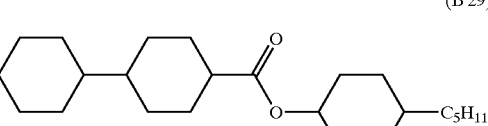
(B'30) 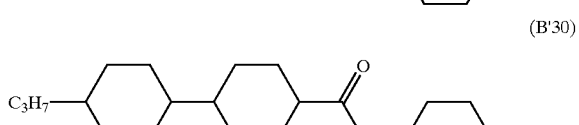
(B'31) 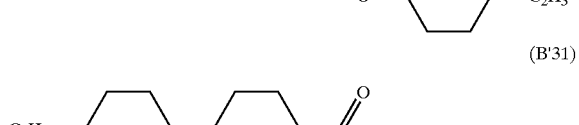
(B'32) 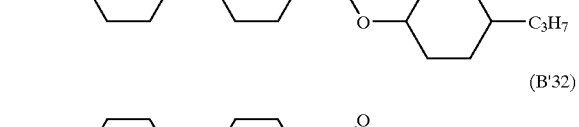
(B'33) 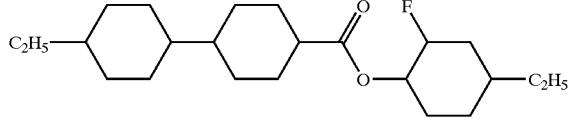
(B'34) 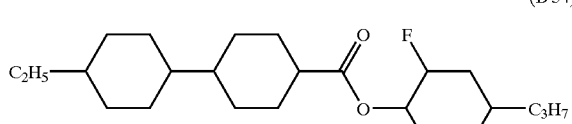
(B'35) 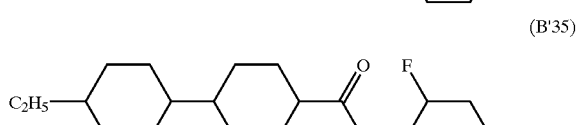
(B'36) 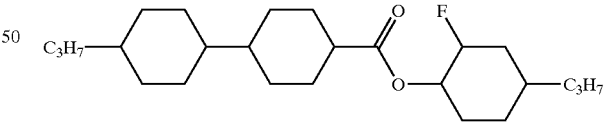
(B'37) 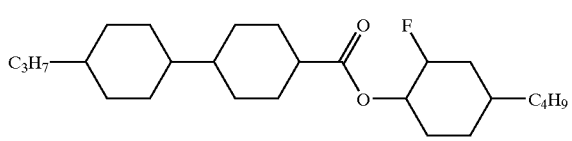
(B'38) 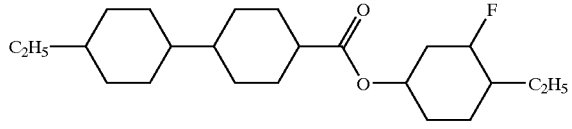
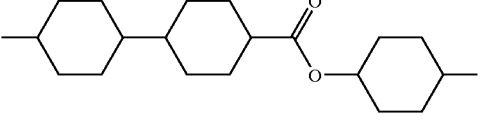

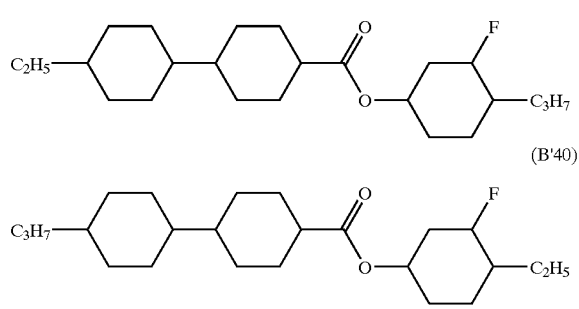

Examples of the chiral agent (chiral material) to be used include various known chiral materials such as an ester compound, pyrimidine compound, azoxy compound, tolan compound and the like. Preferred chiral agents include compounds represented by the following formulae (C1) to (C6)

Examples of the dye which can be added are conventional dyes such as azo compounds, quinone compounds and anthraquinone compounds; dichromatic dyes; etc. A preferred amount of the dye(s) to be used is 3 wt % or less based on a total amount of the liquid crystal components (nematic liquid crystal composition) and the chiral agent. More than 3 wt % lowers the selective reflection amount of the liquid crystal composition and deteriorates the contrast.

(Column Structure)

The structural aspect of column structures will be described first. Column structures which can be employed, for example, include columns of square section, elliptical section, trapezoidal section and like sections, and conical columns which may be arranged at a specified spacing in a predetermined pattern such as a lattice pattern. Columns may be disposed at a predetermined spacing, e.g. in a stripe pattern. Columns may be arranged at an equidistant spacing or at a gradually varied spacing instead of being randomly arranged, or may be arranged in a specified pattern in which the arrangement is repeated in a specified repetition, etc. The arrangement is preferably such that the gap between the substrates can be properly maintained and image display is

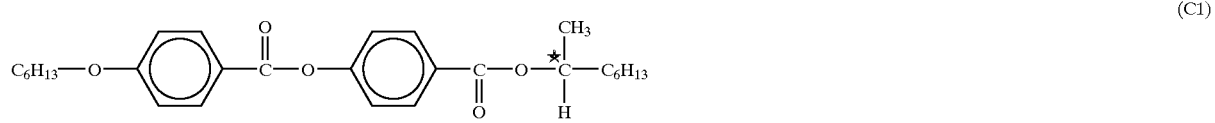

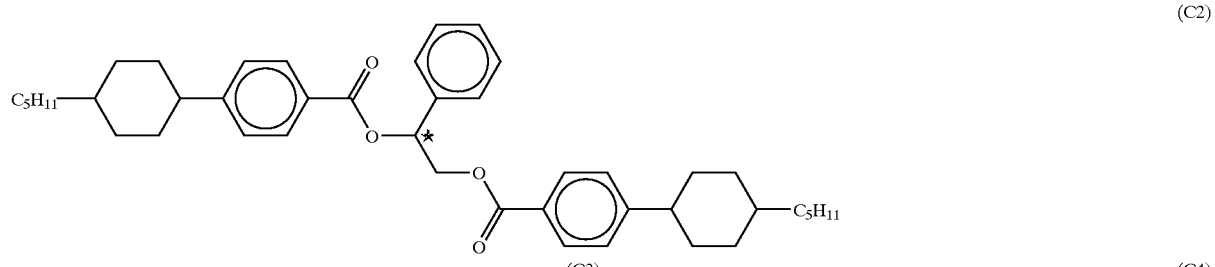

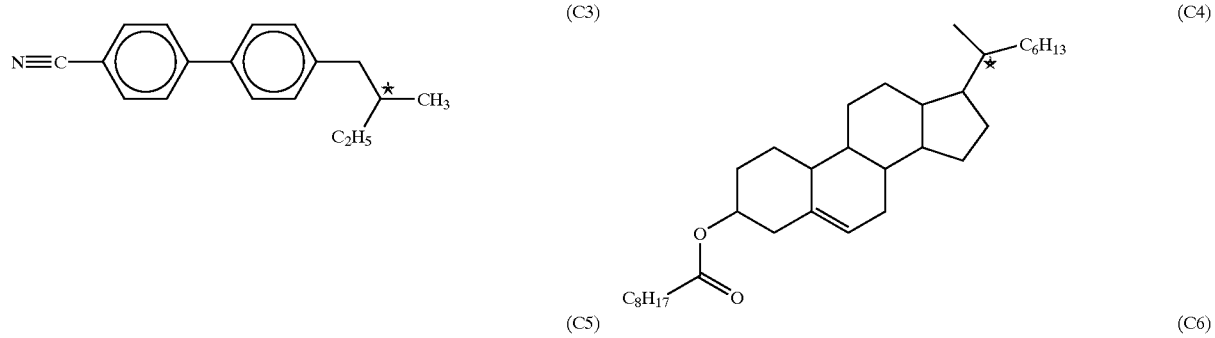

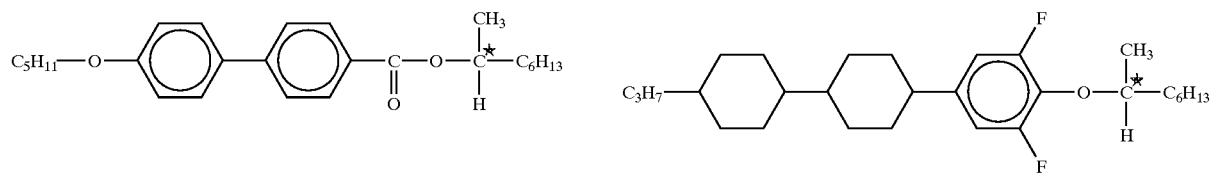

The amount of the chiral agent to be used is 10 wt % to 45 wt % based on a total amount of the nematic liquid crystal composition and the chiral agent. The amount of less than 10 wt % is unlikely to give the desired selective reflection wavelength. The amount of more than 45 wt % is unlikely to allow the chiral nematic liquid crystal composition to exhibit a cholesteric phase at room temperature or may solidify the composition.

not hindered. Useful column structures are those which occupy the display region of liquid crystal display element in a proportion of about 1% to about 40% to impart commercially satisfactory properties to the liquid crystal display element while suitable strength is maintained.

The column structure can be produced from a thermoplastic resin, thermosetting resin, photo-curing resin or like resins.

Column structures can be made by various methods, e.g. can be directly arranged by screen-printing of resin or can be formed by coating the substrate with a resin and subjecting the coating to photolithography process with a mask.

The liquid crystal display element can be formed by, e.g., injecting the liquid crystal composition into the gap between the substrates having column structures therebetween by a vacuum injection method, or by dripping the liquid crystal composition into the space between the substrates just before joining them and sealing the substrates in joining them.

To increase the accuracy in the control of a gap between the substrates, a spacer material of smaller size than the height of column structures such as glass fibers, spherical glass, ceramic powder, or spherical particles composed of organic materials may be disposed between the substrates, so that the gap is prevented from varying due to heating and increased pressure. Thereby the accuracy of the gap is enhanced, and voltage application irregularity and display unevenness are reduced.

<Liquid Crystal Light Modulating Apparatus of Second Embodiment>

Figure 2A:
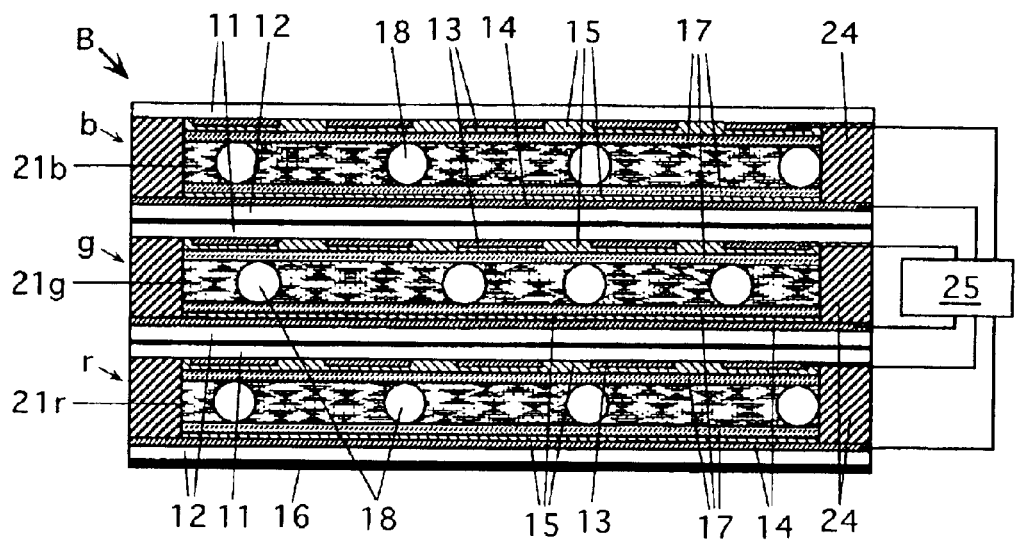
FIG. 2(A) and FIG. 2(B) are schematic views showing a sectional structure of another example of the liquid crystal light modulating apparatus.
Figure 2B:
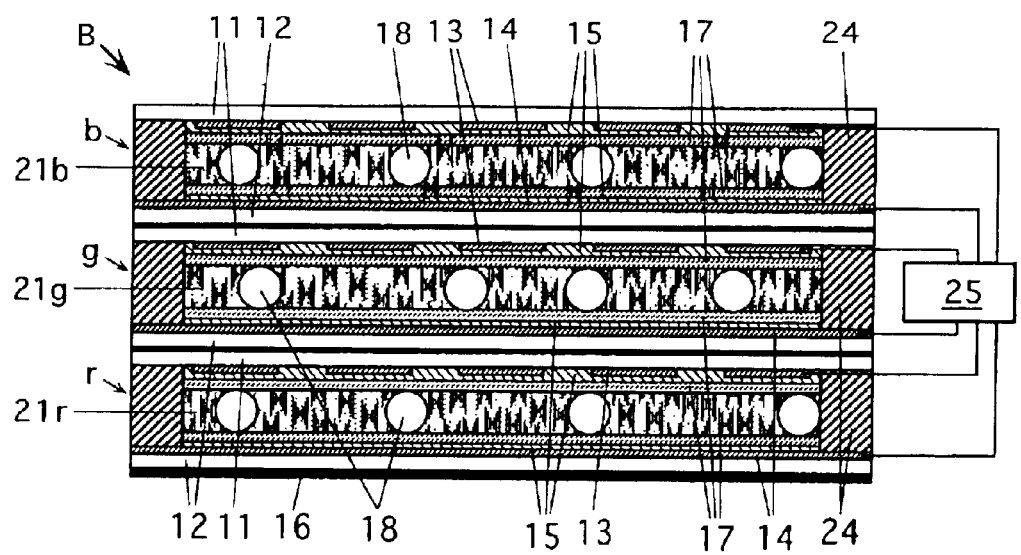

FIG. 2(A) and FIG. 2(B) are schematic views showing a sectional structure of a reflection/laminate type liquid crystal light modulating apparatus B of the second embodiment. FIG. 2(A) shows a planar state of the chiral nematic liquid crystal composition when a high pulse voltage is applied thereto. FIG. 2(B) shows a focal conic state of the chiral nematic liquid crystal composition when a low pulse voltage is applied thereto.

The liquid crystal light modulating apparatus B is basically identical with the liquid crystal light modulating apparatus A of the first embodiment shown in FIGS. 1(A) and 1(B) except that column structures are not provided in the display region of the liquid crystal light modulating apparatus. Like reference characters in FIG. 2(A) and FIG. 2(B) were given to like parts having basically the same structure and the same function as the elements of FIG. 1(A) and FIG. 1(B).

<Liquid Crystal Light Modulating Apparatus of Third Embodiment>

Figure 3:
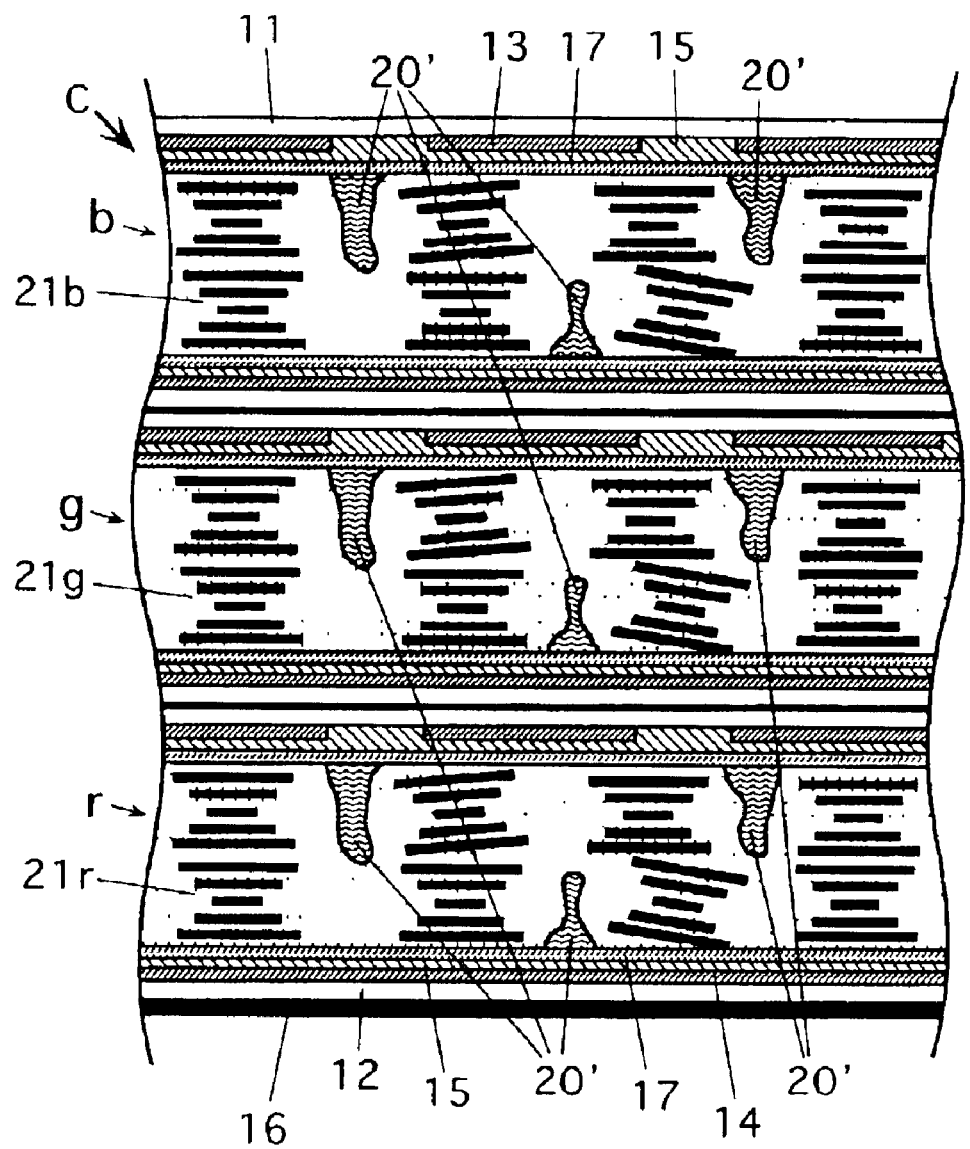
FIG. 3 is a partly enlarged view showing a sectional structure (planar state in application of high pulse voltage) of a further example of the liquid crystal light modulating apparatus.

FIG. 3 is a partly enlarged view showing a sectional structure (planar state in application of high pulse voltage) of a reflection/laminate type liquid crystal light modulating apparatus C according to the third embodiment. The liquid crystal light modulating apparatus C is identical with the liquid crystal light modulating apparatus B of the second embodiment shown in FIG. 2(A) and FIG. 2(B) except that nodule structures 20' are formed, each extending to an intermediate of the gap between the substrates 11, 12. In FIG. 3, like reference characters were given to like parts having basically the same structure and the same function as the elements of FIG. 2(A) and FIG. 2(B). The spacers 18 are employed, but not shown in FIG. 3.

<Liquid Crystal Light Modulating Apparatus of Fourth Embodiment>

Figure 4A:
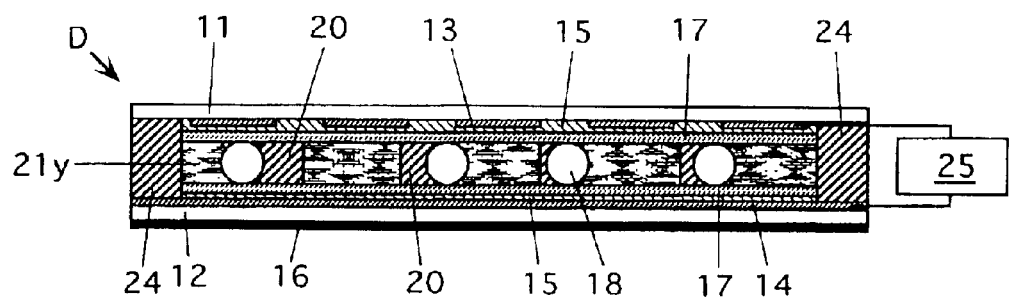
FIG. 4(A) and FIG. 4(B) are schematic views showing a sectional structure of a still further example of the liquid crystal light modulating apparatus.
Figure 4B:
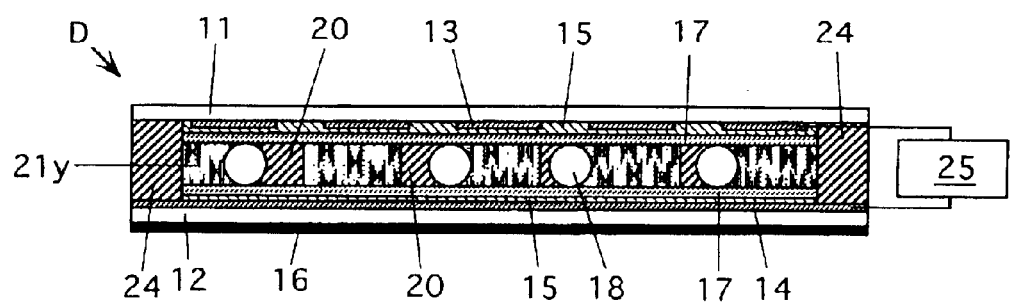

FIG. 4(A) and FIG. 4(B) show a sectional structure of a reflection type liquid crystal light modulating apparatus D of the fourth embodiment. FIG. 4(A) shows a planar state of the chiral nematic liquid crystal composition when a high pulse voltage is applied thereto. FIG. 4(B) shows a focal conic state of the chiral nematic liquid crystal composition when a low pulse voltage is applied thereto.

The liquid crystal light modulating apparatus D has a single liquid crystal layer instead of liquid crystal layers formed in the liquid crystal light modulating apparatus A shown in FIG. 1(A) and FIG. 1(B). The single liquid crystal layer of the apparatus D is substantially identical in structure with the liquid crystal layers shown in FIG. 1(A) and FIG. 1(B). The apparatus D can achieve a mono-color or monochromatic function (2-color image display can be performed with a selective reflection color of liquid crystal composition and a color of visible light absorbing layer on a rear surface). In FIG. 4(A) and FIG. 4(B), like reference characters were given to like parts having basically the same structure and the same function as the elements of FIG. 1(A) and FIG. 1(B).

The liquid crystal light modulating apparatus D has a pair of substrates 11, 12 at least one of which (both in this embodiment) is transparent, a liquid crystal composition 21y disposed between the substrates 11, 12 and space-retaining members 18, 20 provided between the substrates 11, 12 for keeping the gap between them.

The liquid crystal composition 21y is a chiral nematic liquid crystal composition exhibiting a cholesteric phase at room temperature (about 25° C.) which comprises 55 wt % to 90 wt % of a nematic liquid crystal composition that comprises, as main components thereof, a liquid crystal ester compound and a liquid crystal pyrimidine compound containing a fluorine atom in the molecule, and 10 wt % to 45 wt % of a chiral agent.

When required, a visible light absorbing layer 16 is provided on an external surface (rear surface) of the substrate on the side opposite to a light incident side.

<Liquid Crystal Light Modulating Apparatus of Fifth Embodiment>

Figure 5A:
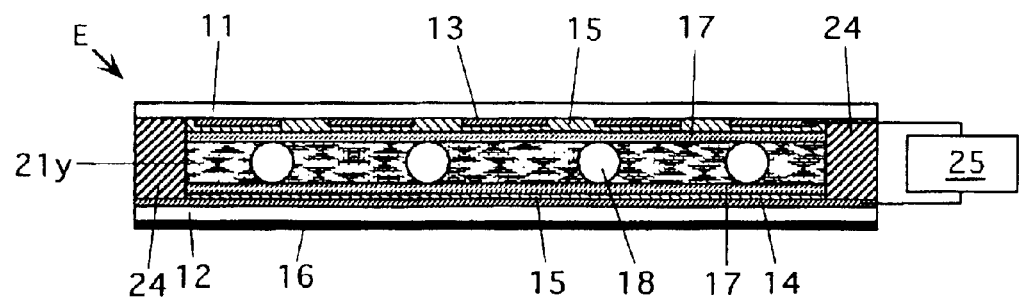
FIG. 5(A) and FIG. 5(B) are schematic views showing a sectional structure of an additional example of the liquid crystal light modulating apparatus.
Figure 5B:
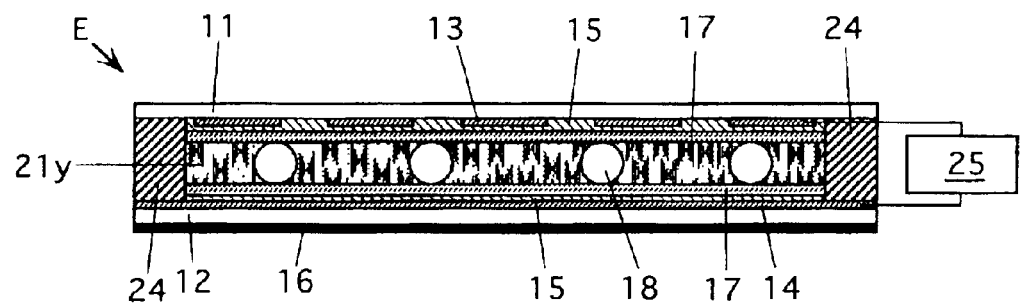

FIG. 5(A) and FIG. 5(B) show a sectional structure of a reflection type liquid crystal light modulating apparatus E of the fifth embodiment. FIG. 5(A) shows a planar state of the chiral nematic liquid crystal composition when a high pulse voltage is applied thereto. FIG. 5(B) shows a focal conic state of the chiral nematic liquid crystal composition when a low pulse voltage is applied thereto.

The liquid crystal light modulating apparatus E is substantially identical in structure with the liquid crystal light modulating apparatus D of the fourth embodiment shown in FIG. 4(A) and FIG. 4(B) except that a column structure is not provided in a display region of the apparatus. The apparatus E can achieve a mono-color or monochromatic function. In FIG. 5(A) and FIG. 5(B), like reference characters were given to like parts having basically the same structure and the same function as the element of FIG. 4(A) and FIG. 4(B).

In the liquid crystal light modulating apparatuses A to E having the foregoing structures, a pulse-applying device 25 is provided as a drive unit for applying a drive voltage to the chiral nematic liquid crystal composition. Image display is performed by applying a pulse voltage across the electrodes 13, 14 from the device 25. Since the liquid crystal compositions 21r, 21g, 21b, 21y can exhibit a cholesteric phase, the liquid crystal compositions can be brought to a planar state (colored state) by applying a relatively high pulse voltage (see FIG. 1(A)), and selectively reflects the light having a wavelength which can be determined based on the helical pitch of the liquid crystal composition and a refractive index in the normal direction of the substrate.

The liquid crystal composition is brought to a forcal conic state (low degree of scattering state) and to a transparent state (see FIG. 1(B)) by applying a relatively low pulse voltage. As shown in FIG. 1(A) and FIG. 1(B) to FIG. 5(A) and FIG. 5(B), the black visible light absorbing layer 16 is provided in the illustrated embodiments, so that when the liquid crystal composition is in the focal conic state, a black background color is displayed.

In the liquid crystal light modulating apparatuses A to E of the first to fifth embodiments as described above, the liquid crystal compositions 21r, 21g, 21b, 21y are chiral nematic liquid crystal compositions which exhibit a cholesteric phase, and which comprise 55 wt % to 90 wt % of a nematic liquid crystal composition comprising, as main components, a liquid crystal ester compound and a fluorine-containing liquid crystal pyrimidine compound and 10 wt % to 45 wt % of a chiral agent. Thus, the apparatus is allowed to achieve a high performance in image display, i.e. enhanced color purity and increased reflectance, shows sharp contrast and involves a low drive voltage.

Experiments were carried out to evaluate the performance of the liquid crystal light modulating apparatuses as described below.

In Experiment Examples and Comparative Experiment Example to be described below, a Y value (luminous reflectance) was measured with use of a spectrocolorimeter, CM-3700d (manufactured by Minolta Co. Ltd.) having a white light source. The lower the Y value in discoloration is, the more transparent the composition is and the better the black display is. The higher the Y value in colored state is, the better the white display is. The contrast was calculated by an equation: (Y value in white display state/Y value in black display state).

EXPERIMENT EXAMPLE 1

A liquid crystal composition J1 was prepared by mixing 79 parts by weight of a nematic liquid crystal composition a (refractive index anisotropy Δn=0.205, dielectric constant anisotropy Δε=17.2, and isotropic phase transition point $T_{N-I}$=97.3° C.) containing 37 wt % of a mixture of liquid crystal pyrimidine compounds represented by the formulae (A4), (A9), (A16), (A17) and (A19) and 28 wt % of a mixture of liquid crystal ester compounds represented by the formulae (B42), (B43), (B48) and (B49) (per 100 wt % of the nematic liquid crystal composition), with 21 parts by weight of a chiral agent(chiral material) S-811 (manufactured by Merck & Co.).

A liquid crystal composition J2 was prepared in the same manner by mixing 73 parts by weight of the nematic liquid crystal composition a with 27 parts by weight of the chiral material S-811.

A liquid crystal composition J3 was prepared in the same manner by mixing 63 parts by weight of the nematic liquid crystal composition a with 37 parts by weight of the chiral material S-811.

The obtained chiral nematic liquid crystal compositions exhibited the cholesteric phase at room temperature. The liquid crystal compositions J1, J2, J3 were prepared so as to selectively reflect the light at wavelengths of about 680 nm, about 560 nm, and about 480 nm, respectively.

Six polycarbonate (PC) film substrates having transparent electrodes were provided. Using a material for an orientation film, AL4552 (manufactured by JSR Corp.), an orientation stabilizing film having 800 Å thickness was formed on the transparent electrodes of each of the three first PC film substrates. Over the orientation stabilizing films were spread spacers (manufactured by Sekisui Finechemical Co., Ltd.) having a particle size of 8 μm, 6 μm and 5 μm respectively.

An insulating film of 2000 Å thickness was formed on the transparent electrodes of each of the remaining three second PC film substrates, using a material for an insulating film, HIM 3000 (manufactured by Hitachi Chemical Co., Ltd.). An orientation stabilizing film of 800 Å thickness was formed on each of the insulating films using the material for an orientation film, AL4552 (manufactured by JSR Corp.)

Subsequently a sealing material, XN21S (manufactured by Mitsui Chemicals Co., Ltd.) was subjected to screen printing at each peripheral portion of the three first substrates to form a wall of predetermined height with a port for entry of the liquid crystal composition. Then, each of the second substrates was superimposed on each of the first substrates and was cured. In this manner, three pairs of substrates were provided.

Thereafter, a specified amount of each of the chiral nematic liquid crystal compositions J1, J2, J3 was injected into the three pairs of substrates through the port for entry of the liquid crystal composition using a vacuum injection device, respectively. Then, the ports were closed with a sealing material to give three kinds of liquid crystal cells j1, j2, j3. These cells were laminated on each other in the order of j1, j2, j3 using an adhesive sheet to provide a laminate type liquid crystal light modulating apparatus. A black light absorbing film was formed on a rear surface of the liquid crystal light modulating apparatus (on a surface of the substrate on the side opposite to a light incident side: external surface (rear surface) of the liquid crystal cell j1).

An investigation was made to determine a minimum voltage for substantially completely bringing the liquid crystal composition to a focal conic state (decolorized state) and a minimum voltage for substantially completely bringing the liquid crystal composition to a planar state (colored state) by applying a pulse voltage across the electrodes in the liquid crystal light modulating apparatus while changing the voltage value and by repeating the measurement of Y value. As a result, each cell was brought to a focal conic state (black display state) by applying a pulse voltage (cell j1: 40V, 5 ms, cell j2: 35V, 5 ms, cell j3: 40V, 5 ms) for driving each cell. The Y value of the laminate was 5.6. Further, each cell was brought to a planar state (white display state) by applying a pulse voltage (cell j1: 60V, 5 ms, cell j2: 50V, 5 ms, cell j3: 55V, 5 ms) for driving each cell. The Y value of the laminate was 40.1.

The laminate (liquid crystal light modulating apparatus) had a contrast of 7.2 and was good in the capability of displaying white and black colors. Especially the Y value in white display state was so high that the image was light and sharp in contrast.

EXPERIMENT EXAMPLE 2

A liquid crystal composition K1 was prepared by mixing 78 parts by weight of a nematic liquid crystal composition b (refractive index anisotropy Δn=0.193, dielectric constant anisotropy Δε=8.6, and isotropic phase transition point $T_{N-I}$= 103° C.) containing 48 wt % of a mixture of liquid crystal pyrimidine compounds represented by the formulae (A1), (A4), (A9), (A11), (A16), (A17) and (A20) and 32 wt % of a mixture of liquid crystal ester compounds represented by the formulae (B11), (B12), (B13), (B14) and (B15) (per 100 wt % of the nematic liquid crystal composition) with 22 parts by weight of the chiral material S-811 (manufactured by Merck & Co.).

A liquid crystal composition K2 was prepared in the same manner by mixing 73 parts by weight of the nematic liquid crystal composition b with 27 parts by weight of the chiral material S-811.

A liquid crystal composition K3 was prepared in the same manner by mixing 63 parts by weight of the nematic liquid crystal composition b with 37 parts by weight of the chiral material S-811.

The obtained chiral nematic liquid crystal compositions exhibited the cholesteric phase at room temperature. The liquid crystal compositions K1, K2, K3 were prepared so as to selectively reflect the light having wavelengths of about 680 nm, about 560 nm and about 480 nm, respectively.

Six polycarbonate (PC) film substrates having transparent electrodes were provided. An orientation stabilizing film having 800 Å thickness was formed on the transparent electrodes of each of the three first PC film substrates using a material for an orientation film, AL4552 (manufactured by JSR Corp.). Over the orientation stabilizing films were spread spacers (manufactured by Sekisui Finechemical Co., Ltd.) having a particle size of 9 μm, 7 μm and 5 μm, respectively.

An insulating film of 2000 Å thickness was formed on the transparent electrodes of each of the remaining three second PC film substrates using a material for an insulating film, HIM 3000 (manufactured by Hitachi Chemical Co., Ltd.). An orientation stabilizing film of 800 Å thickness was formed on each of the insulating films using the material for an orientation film, AL4552 (manufactured by JSR Corp.)

Subsequently a sealing material, XN21S (manufactured by Mitsui Chemicals Co., Ltd.) was subjected to screen printing at each peripheral portion of the three first substrates to form a wall of predetermined height with a port for entry of the liquid crystal composition. Then, each of the second substrates was superimposed on each of the first substrates and was cured. In this manner, three pairs of substrates were provided.

Thereafter, a specified amount of each of the chiral nematic liquid crystal compositions K1, K2, K3 was injected into the three pairs of substrates through the port for entry of a liquid crystal composition using a vacuum injection device, respectively. Then, the ports were closed with a sealing material to give three kinds of liquid crystal cells k1, k2, k3. These cells were laminated on each other in the order of k1, k2, k3 using an adhesive sheet to provide a laminate type liquid crystal light modulating apparatus. A black light absorbing film was formed on a rear surface of the liquid crystal light modulating apparatus (on a surface of the substrate on the side opposite to a light incident side: external surface (rear surface) of the liquid crystal cell k1).

An investigation was made to determine a minimum voltage for substantially completely bringing the liquid crystal composition to a focal conic state (decolorized state) and a minimum voltage for substantially completely bringing the liquid crystal composition to a planar state (colored state) by applying a pulse voltage across the electrodes in the liquid crystal light modulating apparatus while changing the voltage value and by repeating the measurement of Y value. As a result, each cell was brought to a focal conic state (black display state) by applying a pulse voltage (cell k1: 40V, 5 ms, cell k2: 35V, 5 ms, cell k3: 35V, 5 ms) to the cell for driving each cell. The Y value of the laminate was 5.6. Further, each cell was brought to a planar state (white display state) by applying a pulse voltage (cell k1: 60V, 5 ms, cell k2: 55V, 5 ms, cell k3: 55V, 5 ms) to the cell for driving each cell. The Y value of the laminate was 42.4.

The laminate (liquid crystal light modulating apparatus) had a contrast of 7.6 and was good in the capability of displaying white and black colors. Especially the Y value in white display state was so high that the image was light and sharp in contrast.

EXPERIMENT EXAMPLE 3

A chiral nematic liquid crystal composition L1 showing a selective reflection wavelength of 680 nm was prepared by mixing 81 parts by weight of a nematic liquid crystal composition c (refractive index anisotropy Δn=0.211, dielectric constant anisotropy Δε=21.7, and isotropic phase transition point $T_{N-I}$=98° C.) containing 49 wt % of a mixture of liquid crystal pyrimidine compounds represented by the formulae (A1), (A6), (A24), (A27) and (A28), 28 wt % of a mixture of liquid crystal ester compounds represented by the formulae (B1), (B2), (B67) and (B70) and 23 wt % of a mixture of liquid crystal tolan compounds represented by the following formulae (D1) and (D2) (per 100 wt % of the nematic liquid crystal composition) with 19 parts by weight of a 1:3 mixture of a chiral material represented by the formula (C2) with a chiral material represented by the formula (C3).

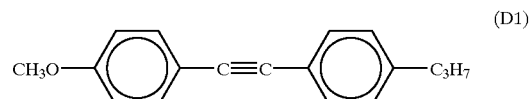

(D1)

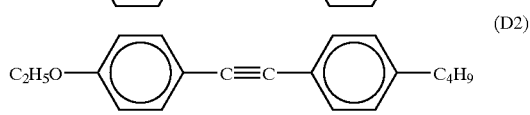

(D2)

A chiral nematic liquid crystal composition M1 showing a selective reflection wavelength of 560 nm was prepared by mixing 87 parts by weight of a nematic liquid crystal composition d (refractive index anisotropy Δn=0.182, dielectric constant anisotropy Δε=15.1, and isotropic phase transition point $T_{N-I}$=102° C.) containing 25 wt % of a mixture of liquid crystal pyrimidine compounds represented by the formulae (A1), (A6), (A12), (A16), (A17) and (A20), 42 wt % of a mixture of liquid crystal ester compounds represented by the formulae (B32), (B33), (B'27) and (B'28), and 11 wt % of a mixture of liquid crystal terphenyl compounds represented by the following formulae (D3) and (D4) (per 100 wt % of the nematic liquid crystal composition) with 13 parts by weight of a 2:3 mixture of the chiral material represented by the formula (C2) with the chiral material represented by the formula (C3).

(D3)

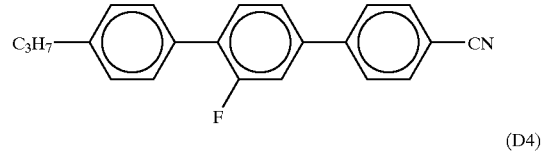

(D4)

A chiral nematic liquid crystal composition N1 showing a selective reflection wavelength of 480 nm was prepared by mixing 65 parts by weight of a nematic liquid crystal composition e (refractive index anisotropy Δn=0.188, dielectric constant anisotropy Δε=22.5, and isotropic phase transition point $T_{N-I}$=103° C.) containing 27 wt % of a mixture of liquid crystal pyrimidine compounds represented by the formulae (A1), (A2), (A7), (A21), (A24) and (A25), 21 wt % of a mixture of liquid crystal ester compounds represented by the formulae (B'16), (B'17), (B'34) and (B'35), 16 wt % of a mixture of liquid crystal phenylcyclohexane compounds represented by the formulae (D5) and (D6), and 20 wt % of liquid crystal biphenyl compounds represented by the formulae (D7) and (D8) (per 100 wt % of the nematic liquid crystal composition) with 35 parts by weight of a chiral material represented by the formula (C6).

(D5)
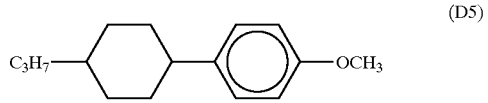

(D6)
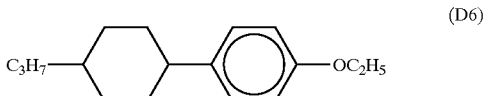

(D7)
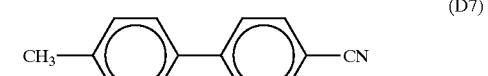

(D8)
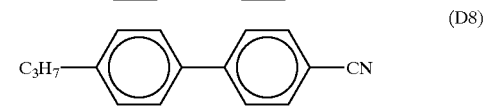

Six polycarbonate (PC) film substrates having transparent electrodes were provided. Using a material for an orientation film, AL4552 (manufactured by JSR Corp.), an orientation stabilizing film having 800 Å thickness was formed on the transparent electrodes of each of the three first PC film substrates. Over the orientation stabilizing films were spread spacers (manufactured by Sekisui Finechemical Co., Ltd.) having a particle size of 8 μm, 6 μm and 5 μm, respectively.

An insulating film of 2000 Å thickness was formed on the transparent electrodes of each of the remaining three second PC film substrates using a material for an insulating film, HIM 3000 (manufactured by Hitachi Chemical Co., Ltd.). An orientation stabilizing film of 800 Å thickness was formed on each of the insulating films using the material for an orientation film, AL4552 (manufactured by JSR Corp.)

Subsequently a sealing material, XN21S (manufactured by Mitsui Chemicals Co., Ltd.) was subjected to screen printing at each peripheral portion of the three first substrates to form a wall of predetermined height with a port for entry of the liquid crystal composition. Then, each of the second substrates was superimposed on each of the first substrates and cured. In this manner, three pairs of substrates were provided.

Thereafter, a specified amount of each of the chiral nematic liquid crystal compositions L1, M1, N1 was injected into the three pairs of substrates through the port for entry of the liquid crystal composition using a vacuum injection device, respectively. Then, the ports were closed with a sealing material to give three kinds of liquid crystal cells l1, m1, n1. These cells were laminated on each other in the order of l1, m1, n1 using an adhesive sheet to provide a laminate type liquid crystal light modulating apparatus. A black light absorbing film was formed on a rear surface of the liquid crystal light modulating apparatus (on a surface of the substrate on the side opposite to a light incident side: external surface (rear surface) of the liquid crystal cell l1).

An investigation was made to determine a minimum voltage for substantially completely bringing the liquid crystal composition to a focal conic state (decolorized state) and a minimum voltage for substantially completely bringing the liquid crystal composition to a planar state (colored state) by applying a pulse voltage across the electrodes in the liquid crystal light modulating apparatus while changing the voltage value and by repeating the measurement of Y value. As a result, each cell was brought to a focal conic state (black display state) by applying a pulse voltage (cell l1:

25V, 5 ms, cell m1: 25V, 5 ms, cell n1: 25V, 5 ms) to the cell for driving each cell. The Y value of the laminate was 5.4. Further, each cell was brought to a planar state (white display state) by applying a pulse voltage (cell l1: 40V, 5 ms, cell m1: 40V, 5 ms, cell n1: 40V, 5 ms) for driving each cell. The Y value of the laminate was 39.3.

The laminate (liquid crystal light modulating apparatus) had a contrast of 7.2 and was good in the capability of displaying white and black colors. Especially the Y value in white display state was so high that the image was light and sharp in contrast.

COMPARATIVE EXPERIMENT EXAMPLE 1

A liquid crystal composition O1 was prepared by mixing 77 parts by weight of a nematic liquid crystal composition f (refractive index anisotropy Δn=0.191, dielectric constant anisotropy Δε=4.3, and isotropic phase transition point $T_{N-I}$= 99.4° C.) containing 75 wt % of a mixture of liquid crystal pyrimidine compounds represented by the formulae (A1), (A9), (A10), (A11) and (A12), but not containing any liquid crystal ester compound with 23 parts by weight of the chiral material S-811 (manufactured by Merck & Co.).

A liquid crystal composition O2 was prepared in the same manner by mixing 72 parts by weight of the nematic liquid crystal composition f with 28 parts by weight of the chiral material S-811.

A liquid crystal composition O3 was prepared in the same manner by mixing 62 parts by weight of the nematic liquid crystal composition f with 38 parts by weight of the chiral material S-811.

The obtained chiral nematic liquid crystal compositions exhibited the cholesteric phase at room temperature. The liquid crystal compositions O1, O2, O3 were prepared so as to selectively reflect the light at wavelengths of about 680 nm, about 560 nm, and about 480 nm, respectively.

Six polycarbonate (PC) film substrates having transparent electrodes were provided. An orientation stabilizing film having 800 Å thickness was formed on the transparent electrodes of each of the three first PC film substrates using a material for an orientation film, AL4552 (manufactured by JSR Corp.). Over the films were spread spacers (manufactured by Sekisui Finechemical Co., Ltd.) having a particle size of 9 μm, 7 μm and 5 μm, respectively.

An insulating film of 2000 Å thickness was formed on the transparent electrodes of each of the remaining three second PC film substrates using a material for an insulating film, HIM 3000 (manufactured by Hitachi Chemical Co., Ltd.). An orientation stabilizing film of 800 Å thickness was formed on each of the insulating films using the material for an orientation film, AL4552.

Subsequently a sealing material, XN21S (manufactured by Mitsui Chemicals Co., Ltd.) was subjected to screen printing at each peripheral portion of three first substrates to form a wall of predetermined height with a port for entry of the liquid crystal composition. Then, each of the second substrates was superimposed on each of the first substrates and cured. In this manner, three pairs of substrates were provided.

Thereafter, a specified amount of each of the chiral nematic liquid crystal compositions O1, O2, O3 was injected into the three pairs of substrates through the port for entry of the liquid crystal composition using a vacuum injection device, respectively. Then, the ports were closed with a sealing material to give three kinds of liquid crystal cells o1, o2, o3. These cells were laminated on each other in the order of o1, o2, o3 using an adhesive sheet to provide a laminate type liquid crystal light modulating apparatus. A black light absorbing film was formed on a rear surface of the liquid crystal light modulating apparatus (on a surface of the substrate on the side opposite to a light incident side: external surface (rear surface) of the liquid crystal cell o1).

An investigation was made to determine a minimum voltage for substantially completely bringing the liquid crystal composition to a focal conic state (decolorized state) and a minimum voltage for substantially completely bringing the liquid crystal composition to a planar state (colored state) by applying a pulse voltage across the electrodes in the liquid crystal light modulating apparatus while changing the voltage value and by repeating the measurement of Y value. As a result, each cell was brought to a focal conic state (black display state) by applying a pulse voltage (cell o1: 70V, 5 ms, cell o2: 55V, 5 ms, cell o3: 60V, 5 ms) to the cell for driving each cell. The Y value of the laminate was 6.3. Further, each cell was brought to a planar state (white display state) by applying a pulse voltage (cell o1: 110V, 5 ms, cell o2: 80V, 5 ms, cell o3: 90V, 5 ms) to the cell for driving each cell. The Y value of the laminate was 43.2. The laminate had a contrast of 6.9.

As described above, the element of Comparative Experiment Example was high in the Y value in white display state, and was able to perform light display. However, the element involved a high drive voltage as compared with the elements of Experiment Examples. A great difference of drive voltage value was entailed between the cells.

Although the present invention has been described and illustrated in detail, it is clearly understood that the same is by way of illustration and example only and is not to be taken by way of limitation, the spirit and the scope of the present invention being limited only by the terms of the appended claims.

What is claimed is:

1. A chiral nematic liquid crystal composition that exhibits a cholesteric phase, said chiral nematic crystal composition comprising:
   55 wt % to 90 wt % of a nematic liquid crystal composition that comprises, as main components thereof, a liquid crystal ester compound and a liquid crystal pyrimidine compound, wherein said liquid crystal ester compound does not include a tolan skeleton therein and said liquid crystal pyrimidine compound includes one or more fluorine atoms therein; and
   10 wt % to 45 wt % of at least one chiral agent.

2. A chiral nematic liquid crystal composition as claimed in claim 1, wherein a total amount of the liquid crystal ester compound which does not include a tolan skeleton and the liquid crystal pyrimidine compound which includes one or more fluorine atoms is at least 45 wt % of a total amount of the nematic liquid crystal composition.

3. A chiral nematic liquid crystal composition as claimed in claim 2, wherein the total amount of the liquid crystal ester compound which does not include a tolan skeleton and the liquid crystal pyrimidine compound which includes one or more fluorine atoms is at least 50 wt % of the total amount of the nematic liquid crystal composition.

4. A chiral nematic liquid crystal composition as claimed in claim 1, wherein the nematic liquid crystal composition further comprises at least one of a liquid crystal biphenyl compound, a liquid crystal phenylcyclohexane compound, a liquid crystal tolan compound and a liquid crystal terphenyl compound.

5. A chiral nematic liquid crystal composition as claimed in claim 4, wherein each amount of at least one of the liquid crystal biphenyl compound, liquid crystal phenylcyclohexane compound, liquid crystal tolan compound and liquid crystal terphenyl compound is in a range from 10 wt % to 55 wt % of a total amount of the nematic liquid crystal composition.

6. A chiral nematic liquid crystal composition as claimed in claim 4, wherein each amount of at least one of the liquid crystal biphenyl compound, liquid crystal phenylcyclohexane compound, liquid crystal tolan compound and liquid crystal terphenyl compound is at most 50 wt % of a total amount of the nematic liquid crystal composition.

7. A chiral nematic liquid crystal composition as claimed in claim 1, wherein the liquid crystal ester compound includes at least one of a fluorine group, a chlorine group and a cyano group.

8. A chiral nematic liquid crystal composition as claimed in claim 1, wherein an amount of each of the liquid crystal ester compound and the liquid crystal pyrimidine compound is in a range from 15 wt % to 85 wt % of a total amount of the nematic liquid crystal composition.

9. A chiral nematic liquid crystal composition as claimed in claim 1, wherein the chiral agent comprises at least two kinds of chiral agents.

10. A chiral nematic liquid crystal composition as claimed in claim 1, wherein the liquid crystal ester compound includes a fluorine atom therein.

11. A chiral nematic liquid crystal composition as claimed in claim 1, wherein the liquid crystal ester compound has a fomula expressed by one of following formulae:

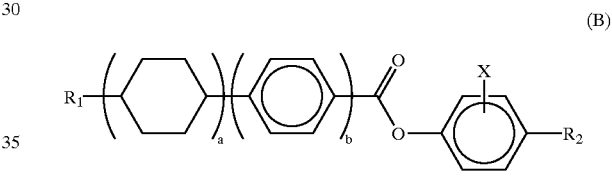

(B)

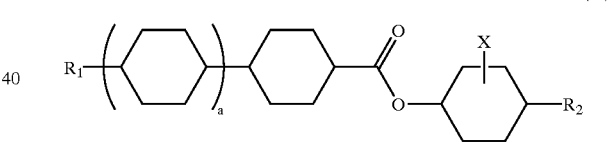

(B')

wherein each of "$R_1$" and "$R_2$" is a cyano group or an alkyl group represented by —$C_nH_{2n+1}$ wherein "n" is an integer of 2 to 10, "X" is a halogen atom or a hydrogen atom, each of "a" and "b" is an integer of 0, 1 or 2, provided that "a" and "b" can not be 0 at the same time.

12. A chiral nematic liquid crystal composition as claimed in claim 1, wherein the liquid crystal pyrimidine compound has a following formula:

(A)

wherein each of "A" and "A'" is a single bond or a phenylene group, provided that they can not be a phenylene group at the same time, each of "$X_1$" and "$X_2$" is a fluorine atom or a hydrogen atom, provided that they can not be a hydrogen atom at the same time, and "n" is an integer of 2 to 10.

13. A liquid crystal light modulating apparatus comprising:
- a pair of substrates at least one of which is transparent; and
- a chiral nematic liquid crystal composition as claimed in claim 1 disposed between the substrates.

14. A liquid crystal light modulating apparatus as claimed in claim 13, wherein at least one of the substrates is made of a resin.

15. A liquid crystal light modulating apparatus as claimed in claim 13 which further comprises a drive unit for applying a drive voltage to the chiral nematic liquid crystal composition, the drive voltage being at most 40V.

16. A liquid crystal light modulating apparatus as claimed in claim 13, wherein no resin network structure is provided between the substrates.

17. A liquid crystal light modulating apparatus as claimed in claim 16, wherein a plurality of resin nodules are provided between the substrates.

18. A liquid crystal light modulating apparatus as claimed in claim 17, wherein the resin nodules form column structures connecting the substrates to each other.

19. A liquid crystal light modulating apparatus as claimed in claim 17, wherein the resin nodules form rib structures each extending from one of the substrates and being terminated at an intermediate of a gap between the substrates.

20. A liquid crystal light modulating apparatus as claimed in claim 13, wherein the chiral nematic liquid crystal composition achieves a memory effect.

21. A liquid crystal light modulating apparatus as claimed in claim 13, wherein the pair of substrates and the chiral nematic liquid crystal composition form a liquid crystal light modulating unit, and wherein the liquid crystal light modulating apparatus comprises a plurality of the liquid crystal light modulating units layered on each other.

22. A chiral nematic liquid crystal composition as claimed in claim 12, wherein "$X_1$" and "$X_2$" are both a fluorine atom.

23. A chiral nematic liquid crystal composition as claimed in claim 12, wherein one of "$X_1$" and "$X_2$" is a fluorine atom and the other is a hydrogen atom.

* * * * *